US008478079B2

(12) United States Patent
Igarashi

(10) Patent No.: US 8,478,079 B2
(45) Date of Patent: Jul. 2, 2013

(54) SCAN CONVERSION APPARATUS, IMAGE ENCODING APPARATUS, AND METHODS OF CONTROLLING THE SAME

(75) Inventor: Susumu Igarashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/133,408

(22) PCT Filed: Feb. 1, 2010

(86) PCT No.: PCT/JP2010/051728
§ 371 (c)(1),
(2), (4) Date: Jun. 8, 2011

(87) PCT Pub. No.: WO2010/095528
PCT Pub. Date: Aug. 26, 2010

(65) Prior Publication Data
US 2011/0243467 A1  Oct. 6, 2011

(30) Foreign Application Priority Data
Feb. 17, 2009 (JP) ................................. 2009-034390

(51) Int. Cl.
*G06K 9/54* (2006.01)
(52) U.S. Cl.
USPC ........... 382/304; 382/303; 382/317; 382/318; 358/470; 358/474
(58) Field of Classification Search
USPC .. 382/247, 248, 303, 304, 317, 318; 358/470, 358/474, 486
See application file for complete search history.

(56) References Cited

U.S. PATENT DOCUMENTS

| | | | | |
|---|---|---|---|---|
| 6,426,975 | B1 | 7/2002 | Nishi et al. | 375/240.13 |
| 6,961,474 | B1 | 11/2005 | Hirano et al. | 382/246 |
| 7,315,686 | B2 * | 1/2008 | Sakamoto | 386/235 |
| 7,382,925 | B2 * | 6/2008 | Boliek et al. | 382/233 |

FOREIGN PATENT DOCUMENTS

| | | |
|---|---|---|
| JP | 04-504040 | 7/1992 |
| JP | 07-050836 A | 2/1995 |

(Continued)

OTHER PUBLICATIONS

U.S. Appl. No. 13/203,719 by Reiko Fujino, filed Aug. 26, 2011.

*Primary Examiner* — Yosef Kassa
(74) *Attorney, Agent, or Firm* — Fitzpatrick, Cella, Harper & Scinto

(57) ABSTRACT

In this invention, scan conversion processing of changing the scan order for each block is used. Parallel scan conversion processing is executed if possible, thereby making the number of scan conversion target blocks per unit time larger than before. To do this, a scan status holding unit holds statistical information based on the appearance frequency values of coefficients in a block. A scan order holding unit holds coefficient position information in which the coefficient positions in a block are arranged based on the scan order. A parallel number determination unit determines the number of blocks processable in parallel based on the statistical information held in the scan status holding unit and supplies the result to a scan conversion unit as a control signal. If the control signal from the parallel number determination unit indicates parallel processing, the scan conversion unit executes scan conversion of two input blocks in parallel.

10 Claims, 23 Drawing Sheets

U.S. PATENT DOCUMENTS

| | | | |
|---|---|---|---|
| 7,593,961 B2 * | 9/2009 | Eguchi et al. | 1/1 |
| 7,852,515 B2 * | 12/2010 | Eschbach et al. | 358/3.28 |
| 7,904,187 B2 * | 3/2011 | Hoffberg et al. | 700/83 |
| 2004/0234141 A1 | 11/2004 | Christopoulos et al. | 382/233 |
| 2005/0100228 A1 | 5/2005 | Kitamura | 382/232 |
| 2006/0146936 A1 | 7/2006 | Srinivasan | 375/240.18 |
| 2011/0255798 A1 | 10/2011 | Fujino et al. | 382/248 |
| 2011/0255799 A1 | 10/2011 | Omori | 382/248 |

FOREIGN PATENT DOCUMENTS

| | | |
|---|---|---|
| JP | 11-252338 A | 9/1999 |
| JP | 2001-517905 A | 10/2001 |
| JP | 2004-032788 A | 1/2004 |
| JP | 2005-160021 A | 6/2005 |
| JP | 2006-191628 A | 7/2006 |
| JP | 2007-129612 A | 5/2007 |
| WO | 91/11074 | 7/1991 |

* cited by examiner

| | 1 | 5 | 6 |
|---|---|---|---|
| 2 | 4 | 7 | 12 |
| 3 | 8 | 11 | 13 |
| 9 | 10 | 14 | 15 |

| | 2 | 5 | 9 |
|---|---|---|---|
| 1 | 3 | 7 | 12 |
| 4 | 6 | 10 | 14 |
| 8 | 11 | 13 | 15 |

| | 1 | 2 | 5 |
|---|---|---|---|
| 4 | 3 | 6 | 9 |
| 8 | 7 | 13 | 14 |
| 10 | 12 | 15 | 11 |

FIG. 7A

| SCAN ORDER : n | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| STATISTICAL INFORMATION : ScanTotals[ ] | 32 | 30 | 28 | 26 | 24 | 22 | 20 | 18 | 16 | 14 | 12 | 10 | 8 | 6 | 4 |

FIG. 7B

| SCAN ORDER : n | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION : ScanOrder[ ] | d | a | e | h | b | i | f | l | e | j | m | g | n | k | o |

F I G. 13
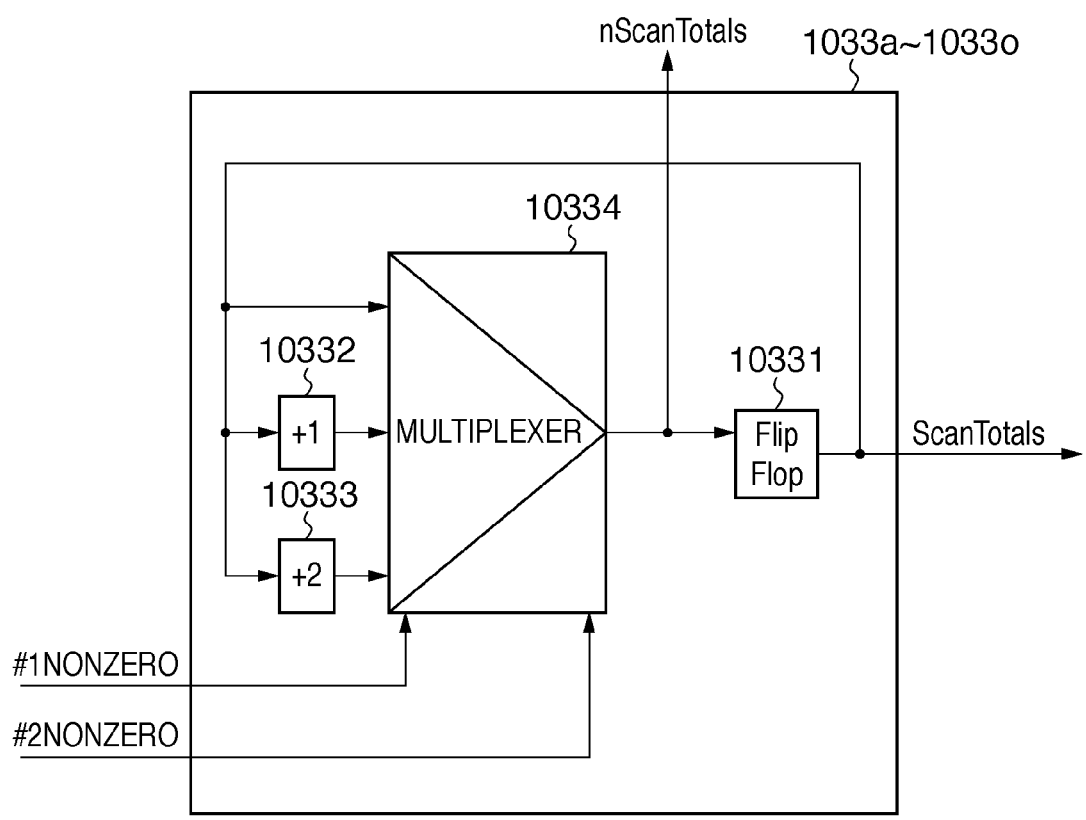

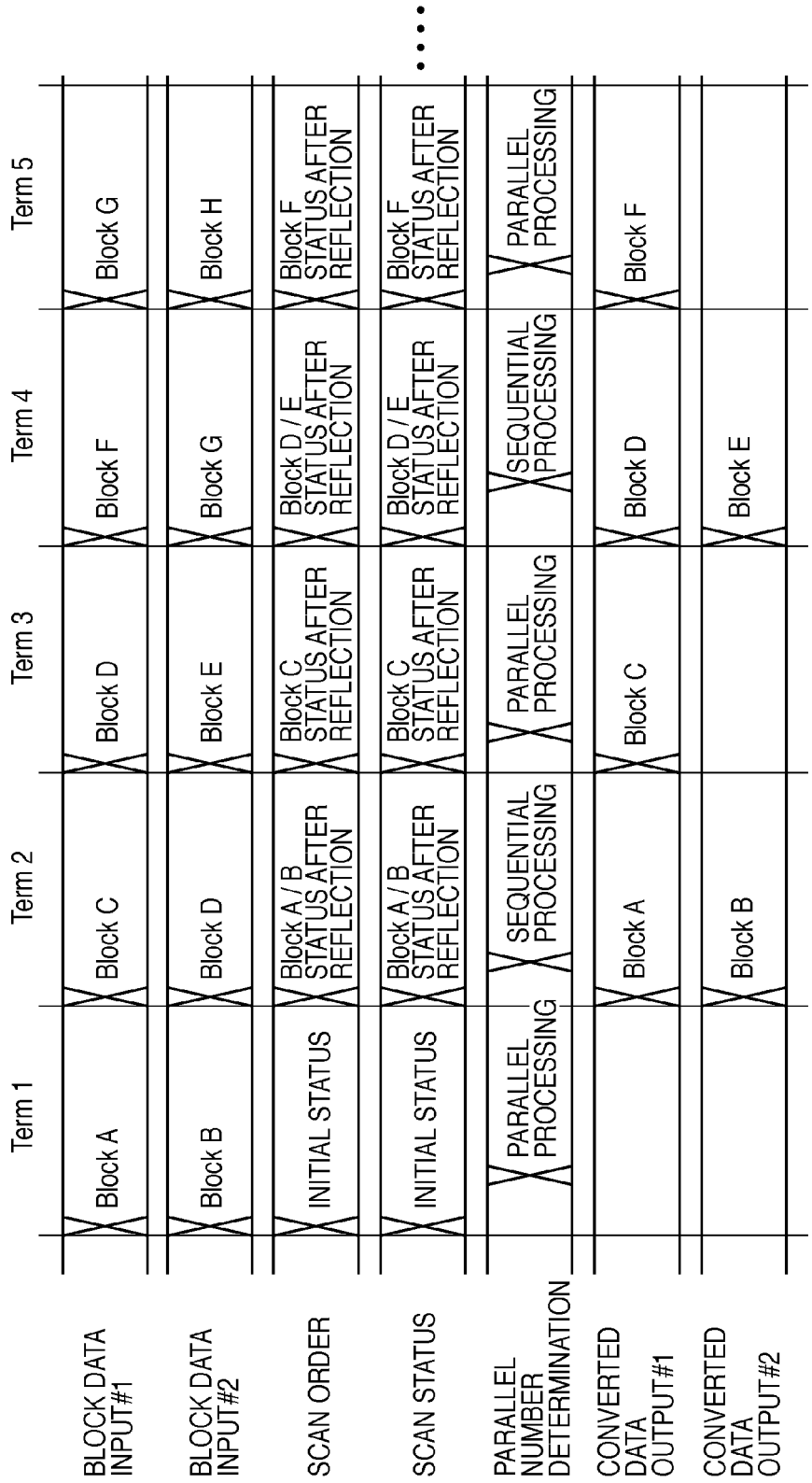

FIG. 17A

- ● : POSITION OF SIGNIFICANT COEFFICIENT OF BLOCK INPUT #1
- ○ : POSITION OF SIGNIFICANT COEFFICIENT OF BLOCK INPUT #2

Term 1

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 32 | 30 | 28 | 26 | 24 | 22 | 20 | 18 | 16 | 14 | 12 | 10 | 8 | 6 | 4 |

BLOCK INPUT #1: Block A
BLOCK INPUT #2: Block B

⇩

Term 2

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | a | e | h | b | i | f | l | c | j | m | g | n | k | o |
| STATISTICAL INFORMATION | 33 | 30 | 30 | 26 | 24 | 22 | 20 | 18 | 17 | 14 | 12 | 10 | 8 | 6 | 4 |

PORTION WHERE SCAN ORDERS CAN REPLACE

BLOCK INPUT #1: Block C
BLOCK INPUT #2: Block D

⇩

Term 3

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | e | a | h | b | i | f | l | c | j | m | g | n | k | o |
| STATISTICAL INFORMATION | 33 | 31 | 30 | 26 | 25 | 23 | 20 | 18 | 17 | 14 | 12 | 10 | 8 | 6 | 4 |

SCAN ORDER REPLACEMENT OCCURS

BLOCK INPUT #1: Block D
BLOCK INPUT #2: Block E

TO FIG.17B ⇩

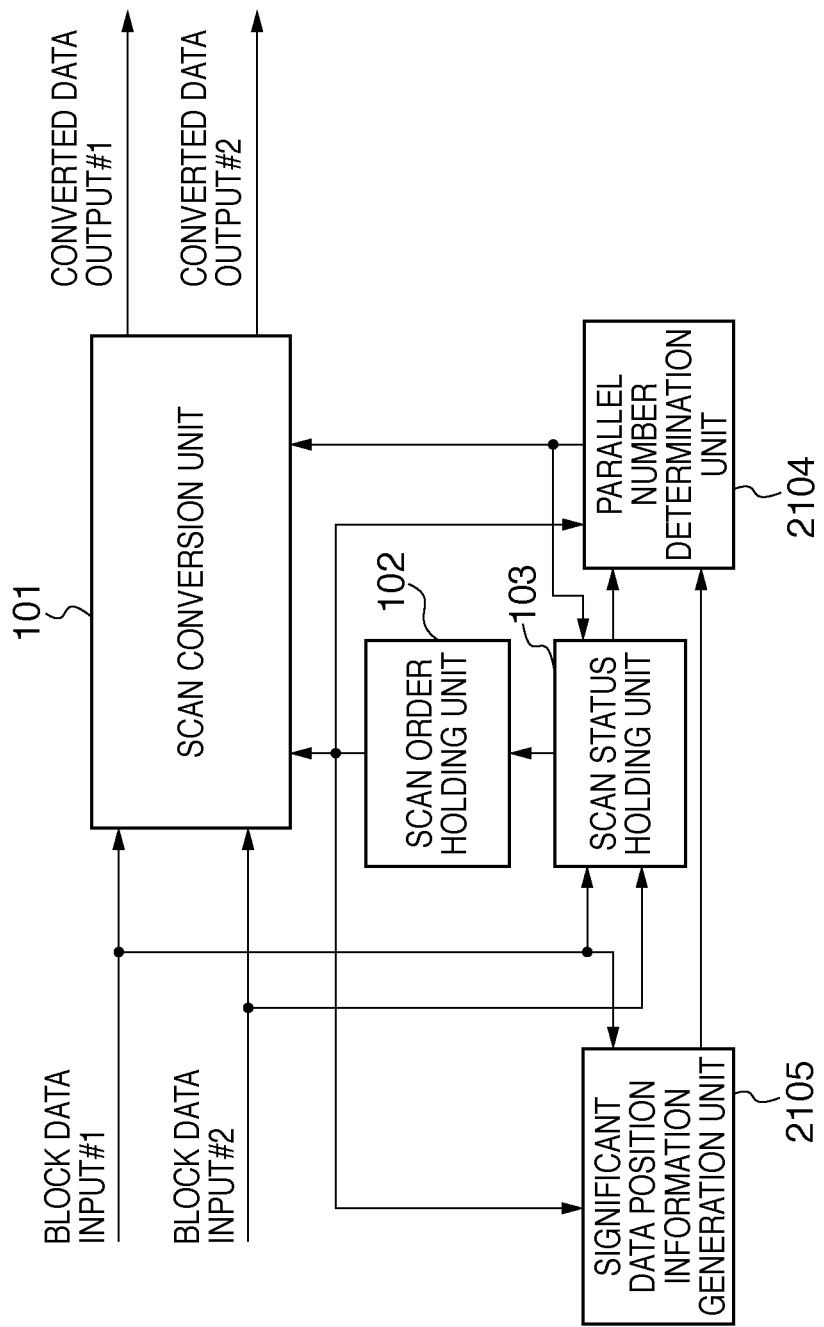

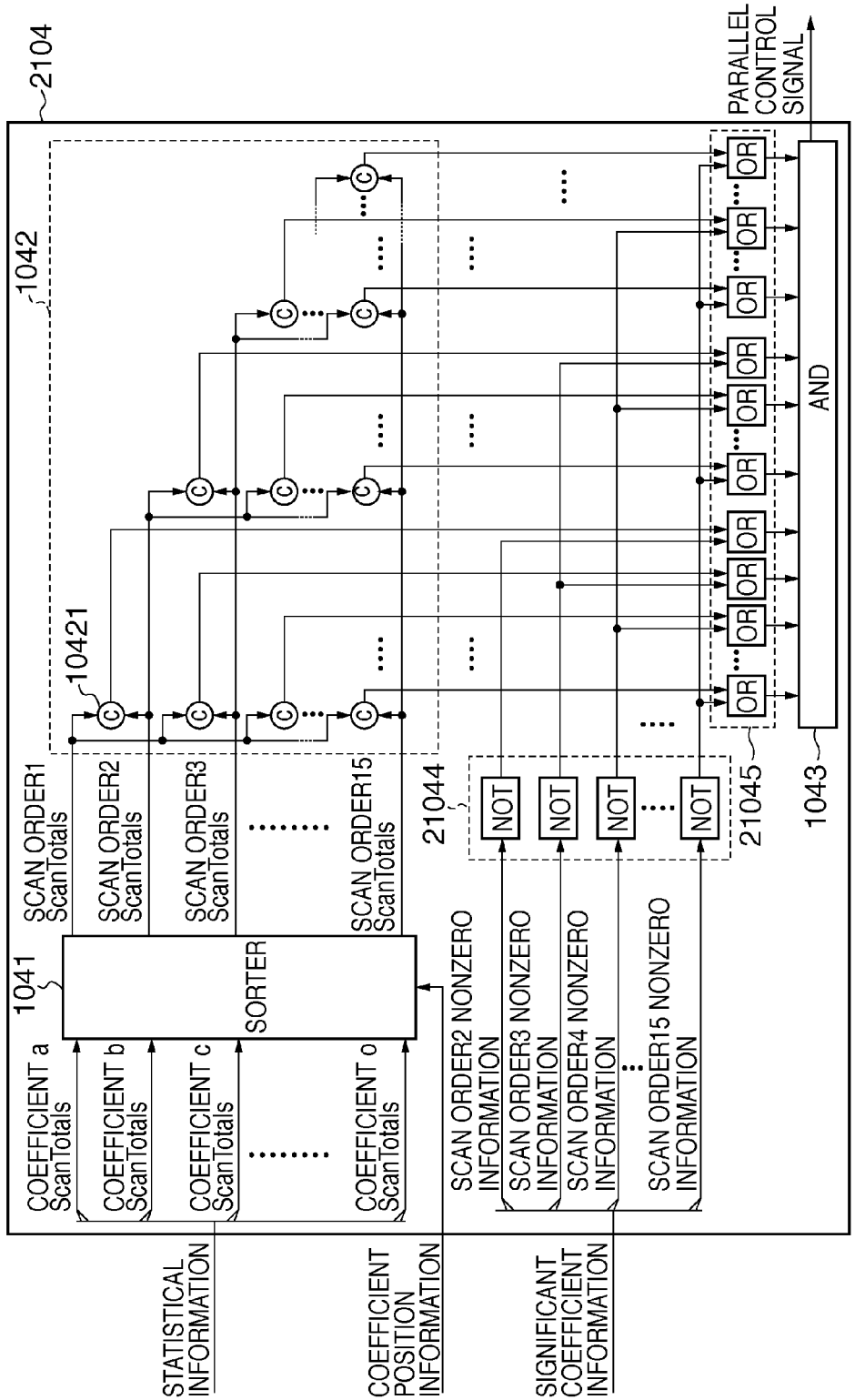

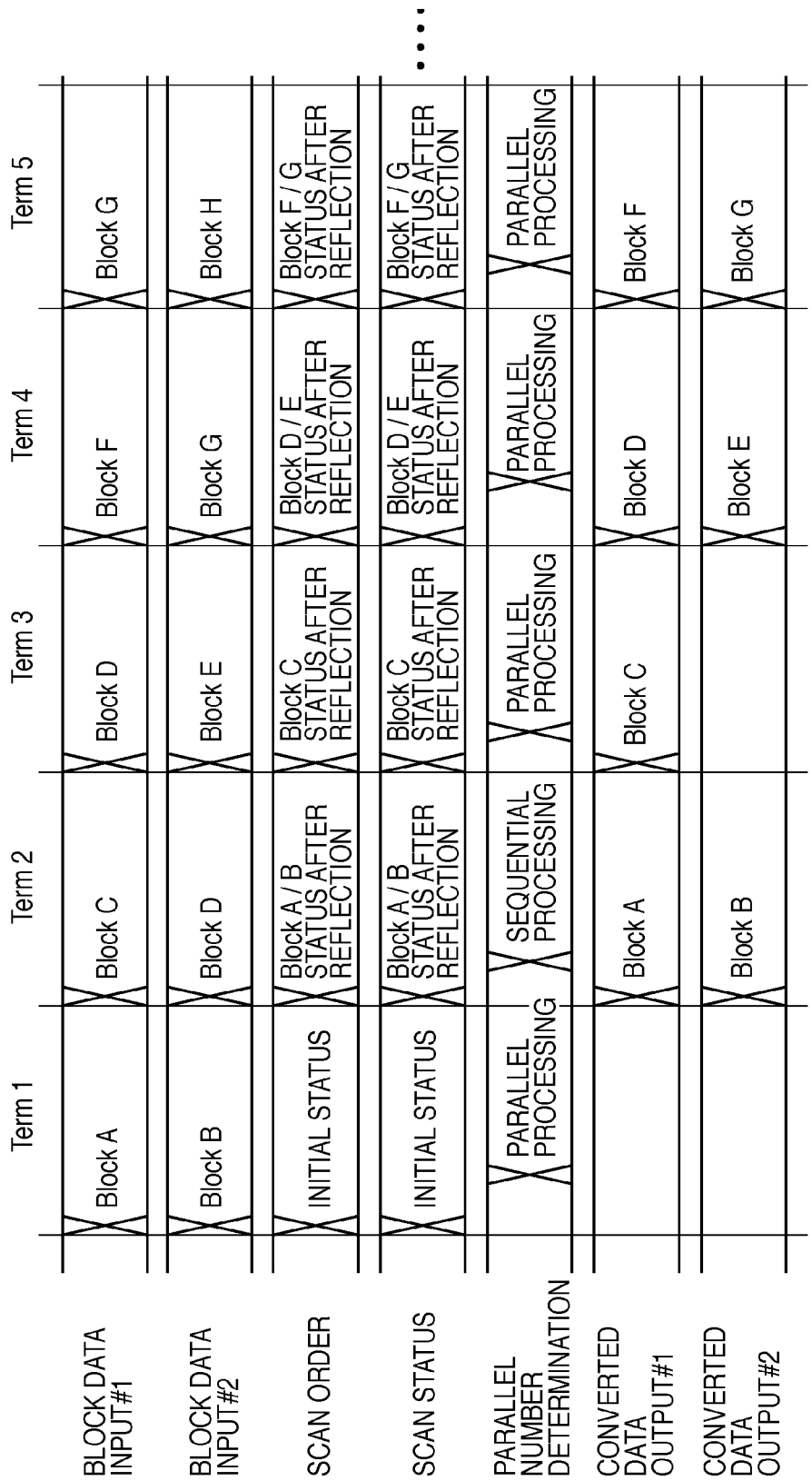

F I G. 23B

FROM FIG.23A

● : POSITION OF SIGNIFICANT COEFFICIENT OF BLOCK INPUT #1
○ : POSITION OF SIGNIFICANT COEFFICIENT OF BLOCK INPUT #2

Term 4

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | e | a | h | b | i | f | l | c | j | m | g | n | k | o |
| STATISTICAL INFORMATION | 35 | 31 | 30 | 26 | 25 | 24 | 21 | 18 | 17 | 14 | 14 | 10 | 8 | 6 | 4 |

BLOCK INPUT#1

| ▨ | 0 | 0 | 0 |
|---|---|---|---|
| 3 | 7 | 0 | 0 |
| 0 | 0 | 0 | 0 |
| 0 | 0 | 0 | 0 |

Block F

BLOCK INPUT#2

| ▨ | 0 | 0 | 0 |
|---|---|---|---|
| 0 | 0 | 0 | 0 |
| 6 | 0 | 0 | 0 |
| 0 | 0 | 0 | 0 |

Block G

NO REPLACEMENT OCCURS ALTHOUGH STATISTICAL INFORMATION IS SAME

Term 5

| SCAN ORDER | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COEFFICIENT POSITION | d | e | a | h | b | i | f | l | c | j | m | g | n | k | o |
| STATISTICAL INFORMATION | 36 | 32 | 31 | 27 | 25 | 24 | 21 | 18 | 17 | 14 | 14 | 10 | 8 | 6 | 4 |

| ▨ | 0 | 0 | 0 |
|---|---|---|---|
| 0 | 9 | 0 | 0 |
| 0 | 0 | 0 | 0 |
| 1 | 0 | 0 | 0 |

Block H

| ▨ | 0 | 0 | 0 |
|---|---|---|---|
| 2 | 0 | 0 | 0 |
| 0 | 0 | 0 | 0 |
| 0 | 0 | 0 | 0 |

Block I

SCAN CONVERSION APPARATUS, IMAGE ENCODING APPARATUS, AND METHODS OF CONTROLLING THE SAME

TECHNICAL FIELD

The present invention relates to a scan conversion apparatus, image encoding apparatus, and methods of controlling the same.

BACKGROUND ART

Image data having a large data amount is not suitable for storage or transmission unless it undergoes processing. Generally, image data is compression-coded to decrease the data amount. A general image encoding apparatus will now be described.

A digital image captured by an image sensing device or the like is divided into tiles each having a desired rectangular size. Each tile is further divided into predetermined two-dimensional MBs (macroblocks) (FIG. 5). Each MB data undergoes orthogonal transform and is thus converted from color space data to transform coefficients in the frequency space.

Quantization processing is also performed for the transform coefficients as needed. If the data pattern of the image extends across a plurality of blocks, intra-frame prediction is performed to obtain the quantized transform coefficients in accordance with the frequency bands, thereby further decreasing the strength of the transform coefficients. However, if the quantized value changes depending on the coefficient position in a block or between blocks, correlation according to the frequency bands of the transform coefficients is not necessarily maintained even if the data pattern of the image extends across a plurality of blocks. It is therefore not always possible to suppress the strength of the transform coefficients by intra-frame prediction. In such a case, the intra-frame prediction processing may be omitted.

The two-dimensional transform coefficients which have undergone quantization and intra-frame prediction are sorted into one-dimensional data by continuously placing significant coefficients ahead and runs (zeros) behind. Thus sorted one-dimensional data is entropy-coded to generate a code stream.

The code stream generated in the above-described way is reconstructed into the image in accordance with a reverse processing procedure.

An image encoding apparatus which converts each of a number of blocks represented by JPEG, MPEG2, MPEG4, JPEG-XR, and the like uses run-length encoding for entropy encoding. Run-length encoding scans two-dimensionally arrayed transform coefficients in accordance with a predetermined pattern to sort them into a one-dimensional array, thereby encoding the length of continuous runs. FIG. 3A shows an example of the scan pattern. Scan is performed in the illustrated numerical order. This is called a "zigzag" pattern because the numerical order indicates a zigzag route. However, a predetermined pattern such as the "zigzag" pattern does not necessarily contributes to the encoding efficiency due to the following three reasons.

First, if conversion is performed across a plurality of blocks to suppress block distortion, the edge is enhanced, resulting in a larger transform coefficient variance and a higher transform coefficient strength. In this case, the strength of a low-frequency transform coefficient (the transform coefficient at the lower right corner of a block) does not always decrease. For this reason, the scan order for scanning transform coefficients from the upper left to the lower right of a block is not necessarily optimum.

Second, when the pixels in a block have a dependence in the vertical or horizontal direction, the frequency bands of transform coefficients tend to be localized in accordance with the dependence. In this case, a scan order which changes in the horizontal or vertical direction, as shown in FIG. 3B or 3C, is suitable.

Third, if a texture exists across blocks, transform coefficients are localized between the blocks in the same tendency. In this case, coefficient prediction is performed for the quantized transform coefficients, thereby suppressing the coefficient strength. The localization of the frequency bands of the transform coefficients changes depending on the prediction method. Hence, a scan pattern complying with the prediction method is necessary.

For the above-described reasons, it is preferable to select an optimum scan order suitable for an input image and an encoding scheme (e.g., Japanese Patent Laid-Open No. 2004-032788).

For an encoding scheme represented by JPEG-XR which further divides each MB into blocks so as to change the quantized values or intra-frame prediction method in each block, a method of changing the scan order for each block is suitable (e.g., Japanese Patent Laid-Open Nos. 2006-191628 and 07-050836).

For example, according to the scan order deciding method described in Japanese Patent Laid-Open No. 2006-191628, an MB including 16×16 pixels is divided into blocks each including 4×4 pixels, as shown in FIG. 4. Scan conversion of the blocks is performed in the order of A to P in FIG. 4. According to this method, the scan conversion result of the block A is analyzed, that is, the coefficients are analyzed in the order after sorting, thereby deciding the scan order of the next block B. Similarly, the scan conversion result of the block B is analyzed, that is, the coefficients are analyzed in the order after sorting, thereby deciding the scan order of the next block C. In the same way, depending on the scan conversion result of the current process target block, the scan order of the next block is decided. The scan order deciding method will be described in more detail with reference to FIG. 6.

First, in step S801, one transform coefficient C[n] (n≧0) is acquired in the one-dimensional order from a block that has undergone scan conversion. Next, in step S802, it is determined whether the coefficient C[n] acquired in step S801 is a run (zero). If the transform coefficient C[n] is a run, the process advances to determination in step S804. On the other hand, if the transform coefficient C[n] is a significant coefficient (nonzero), the process in step S803 is executed.

A statistical information table ScanTotals which counts the number of significant coefficients generated at each position of a 4×4 block is updated. For example, FIG. 7A shows an example of the statistical information table ScanTotals. FIG. 7A shows statistical information table values corresponding to the positions in the 4×4 pixel block corresponding to the scan order, as shown in FIG. 7B, for the descriptive convenience.

Note that the initial values of the statistical information ScanTotals are set as follows in some cases.

$$\{t*N, t*(N-1), t*(N-2), \ldots, t\}$$

In general, a small integer (2 or 4) is selected as t. The value t may be decided by a quantization parameter used in quantization. Resetting the statistical information at a predetermined period allows the maximum bit length of the elements of the statistical information to be fixed.

There also exists a table ScanOrder representing the correspondence between the scan order and the positions of coefficients in a 4×4 pixel block. The initial order of the coefficient positions ScanOrder corresponding to the scan order is preferably decided causally between an image encoding processing apparatus and an image decoding processing apparatus. For example, when coefficient prediction has been done in the horizontal direction, the scan order is initialized to the order of preferentially scanning in the horizontal direction (FIG. 3C). On the other hand, when coefficient prediction has been performed in the vertical direction, the scan order is initialized to the order of preferentially scanning in the vertical direction (FIG. 3B). Note that the scan order in the horizontal direction may also be used as the initial scan order of a block which does not exhibit any specific directivity. Each of symbols a to o in FIG. 4 indicates the correspondence with a coefficient position in a given 4×4 pixel block shown in FIG. 4. Referring to FIG. 7B, the scan order table ScanOrder in the initialized status shown in FIG. 3B is represented by a to o in FIG. 4.

For a significant coefficient, the appearance frequency value of the corresponding element in the statistical information table ScanTotals is incremented (increased) in step S803.

In step S804, the ordering between two pieces of statistical information ScanTotals[n] and ScanTotals[n−1] is determined. ScanTotals[n]>ScanTotals[n−1] means that the number of times of significant coefficient generation is larger at the position of the transform coefficient C[n] than at the position of a transform coefficient C[n−1]. Hence, in step S805, conversion processing is performed for the coefficient position ScanOrder corresponding to the scan order and ScanTotals corresponding to it. If the statistical information ScanTotals[n] ScanTotals[n−1] in step S804, the scan order change processing is not executed.

The conversion processing in step S805 will be described in detail. In the conversion processing, to replace the coefficient positions ScanOrder[n] and ScanOrder[n−1] with each other, for example, the following calculations are performed.

Temp=ScanOrder[$n$−1]

ScanOrder[$n$−1]=ScanOrder[$n$]

ScanOrder[$n$]=Temp

To replace the statistical information ScanTotals[n] and ScanTotals[n−1] with each other, for example, the following calculations are performed.

Temp=ScanTotals[$n$−1]

ScanTotals[$n$−1]=ScanTotals[$n$]

ScanTotals[$n$]=Temp

Upon determining in step S806 that transform coefficient acquisition in the block for scan order decision has not ended yet, the process advances to step S807 to prepare for acquisition of the next coefficient. If all coefficients in the block have been acquired, the scan order decision procedure ends.

As described above, the coefficient position ScanOrder[n−1] corresponding to the scan order n−1 is causally decided using the statistical information ScanTotals[n] and ScanTotals[n−1] corresponding to the scan orders n and n−1. This allows to decide an optimum scan order stepwise. In addition, since the scan order can causally be decided, the encoding apparatus need not add, to the code stream, information to explicitly notify the decoding apparatus of the scan order.

As described above, in the scan order deciding method of deciding the scan order of a block based on the status of the preceding block, the scan order can change for each block. In such scan conversion processing, it is difficult to execute scan conversion of a plurality of blocks so the processing cannot sufficiently speed up.

DISCLOSURE OF INVENTION

The present invention provides a technique of solving the above-described problem and, more particularly, a technique of increasing the number of scan conversion target blocks per unit time by using scan conversion processing of changing the scan order for each block but executing the scan conversion processing in parallel if possible.

In order to solve the above-described problem, for example, the present invention in its first aspect provides an apparatus for sorting data in a block having n rows×m columns based on a predetermined scan order, comprising: scan status holding means for updating and holding a current scan status in accordance with a status of the data in the block; scan order holding means for updating and holding a scan order in accordance with the scan status; parallel number determination means for instructing to perform scan conversion processing of N blocks (N is an integer: N≧2) as M-parallel processing (M is an integer: 1≦M≦N) in accordance with the scan status held by the scan status holding means; and scan conversion means for sorting, in accordance with the instruction from the parallel number determination means, the data in the block based on the scan order held by the scan order holding means.

The present invention in its second aspect provides an apparatus for sorting data in a block having n rows×m columns based on a predetermined scan order, comprising: scan status holding means for updating and holding a current scan status in accordance with a status of the data in the block; scan order holding means for updating and holding a scan order in accordance with the scan status; significant data position information generation means for generating position information of significant data that exists in the block; parallel number determination means for instructing to perform scan conversion processing of N blocks (N is an integer: N≧2) as M-parallel processing (M is an integer: 1≦M≦N) in accordance with the scan status held by the scan status holding means and the position information output from the significant data position information generation means; and scan conversion means for sorting, in accordance with the instruction from the parallel number determination means, the data in the block based on the scan order held by the scan order holding means.

The present invention in its third aspect provides a method of sorting data in a block having n rows×m columns based on a predetermined scan order, comprising: a scan status holding step of updating and holding a current scan status in accordance with a status of the data in the block; a scan order holding step of updating and holding a scan order in accordance with the scan status; a parallel number determination step of instructing to perform scan conversion processing of N blocks (N is an integer: N≧2) as M-parallel processing (M is an integer: 1≦M≦N) in accordance with the scan status held in the scan status holding step; and a scan conversion step of sorting, in accordance with the instruction in the parallel number determination step, the data in the block based on the scan order held in the scan order holding step.

The present invention in its fourth aspect provides a method of sorting data in a block having n rows×m columns based on a predetermined scan order, comprising: a scan status holding step of updating and holding a current scan status in accordance with a status of the data in the block; a scan order holding step of updating and holding a scan order in accordance with the scan status; a significant data position information generation step of generating position information of significant data that exists in the block; a parallel number determination step of instructing to perform scan conversion processing of N blocks (N is an integer: N≧2) as M-parallel processing (M is an integer: 1≦M≦N) in accordance with the scan status held in the scan status holding step and the position information output in the significant data position information generation step; and a scan conversion step of sorting, in accordance with the instruction in the parallel number determination step, the data in the block based on the scan order held in the scan order holding step.

The present invention in its fifth aspect provides an image encoding apparatus comprising: image dividing means for dividing an image into unit blocks each having n rows×m columns; orthogonal transform means for performing orthogonal transform of each unit block output from the image dividing means and outputting transform coefficients; quantization means for quantizing the transform coefficients output from the orthogonal transform means and outputting quantized transform coefficients; scan conversion means for sorting the quantized transform coefficients output from the quantization means in each unit block and outputting the quantized transform coefficients; and entropy encoding means for entropy-encoding the quantized transform coefficients output from the scan conversion means and outputting a code stream, the scan conversion means comprising: scan status holding means for updating and holding a current scan status in accordance with a status of data in the block; scan order holding means for updating and holding a scan order in accordance with the scan status; parallel number determination means for instructing to perform scan conversion processing of N blocks (N is an integer: N≧2) as M-parallel processing (M is an integer: 1≦M≦N) in accordance with the scan status held by the scan status holding means; and scan conversion means for sorting, in accordance with the instruction from the parallel number determination means, the data in the block based on the scan order held by the scan order holding means.

The present invention in its sixth aspect provides an image encoding apparatus comprising: image dividing means for dividing an image into unit blocks each having n rows×m columns; orthogonal transform means for performing orthogonal transform of each unit block output from the image dividing means and outputting transform coefficients; quantization means for quantizing the transform coefficients output from the orthogonal transform means and outputting quantized transform coefficients; scan conversion means for sorting the quantized transform coefficients output from the quantization means in each unit block and outputting the quantized transform coefficients; and entropy encoding means for entropy-encoding the quantized transform coefficients output from the scan conversion means and outputting a code stream, the scan conversion means comprising: scan status holding means for updating and holding a current scan status in accordance with a status of data in the block; scan order holding means for updating and holding a scan order in accordance with the scan status; significant data position information generation means for generating position information of significant data that exists in the block; parallel number determination means for instructing to perform scan conversion processing of N blocks (N is an integer: N≧2) as M-parallel processing (M is an integer: 1≦M≦N) in accordance with the scan status held by the scan status holding means and the position information output from the significant data position information generation means; and scan conversion means for sorting, in accordance with the instruction from the parallel number determination means, the data in the block based on the scan order held by the scan order holding means.

The present invention in its seventh aspect provides a method of controlling an image encoding apparatus, comprising: an image dividing step of dividing an image into unit blocks each having n rows×m columns; an orthogonal transform step of performing orthogonal transform of each unit block output in the image dividing step and outputting transform coefficients; a quantization step of quantizing the transform coefficients output in the orthogonal transform step and outputting quantized transform coefficients; a scan conversion step of sorting the quantized transform coefficients output in the quantization step in each unit block and outputting the quantized transform coefficients; and an entropy encoding step of entropy-encoding the quantized transform coefficients output in the scan conversion step and outputting a code stream, the scan conversion step comprising: a scan status holding step of updating and holding a current scan status in accordance with a status of data in the block; a scan order holding step of updating and holding a scan order in accordance with the scan status; a parallel number determination step of instructing to perform scan conversion processing of N blocks (N is an integer: N≧2) as M-parallel processing (M is an integer: 1≦M≦N) in accordance with the scan status held in the scan status holding step; and a scan conversion step of sorting, in accordance with the instruction in the parallel number determination step, the data in the block based on the scan order held in the scan order holding step.

The present invention in its eighth aspect provides a method of controlling an image encoding apparatus, comprising: an image dividing step of dividing an image into unit blocks each having n rows×m columns; an orthogonal transform step of performing orthogonal transform of each unit block output in the image dividing step and outputting transform coefficients; a quantization step of quantizing the transform coefficients output in the orthogonal transform step and outputting quantized transform coefficients; a scan conversion step of sorting the quantized transform coefficients output in the quantization step in each unit block and outputting the quantized transform coefficients; and an entropy encoding step of entropy-encoding the quantized transform coefficients output in the scan conversion step and outputting a code stream, the scan conversion step comprising: a scan status holding step of updating and holding a current scan status in accordance with a status of data in the block; a scan order holding step of updating and holding a scan order in accordance with the scan status; a significant data position information generation step of generating position information of significant data that exists in the block; a parallel number determination step of instructing to perform scan conversion processing of N blocks (N is an integer: N≧2) as M-parallel processing (M is an integer: 1≦M≦N) in accordance with the scan status held in the scan status holding step and the position information output in the significant data position information generation step and a scan conversion step of sorting, in accordance with the instruction in the parallel number determination step, the data in the block based on the scan order held in the scan order holding step.

The present invention in its ninth aspect provides a scan conversion apparatus which repeatedly executes, for run-length encoding, scanning N data in two-dimensionally arrayed blocks each having m×n data to convert the N data into one-dimensionally arrayed data and outputting the data, comprising: setting means for setting initial sorting information in which positions of scan target data in the m×n data and statistical appearance frequency values of nonzero at the positions are paired and arranged in descending order of the appearance frequency values of the scan target data; a plurality of scan conversion means executable in parallel, each scan conversion means sequentially reading out and outputting data in a block of interest in an order of data positions based on the sorting information, and if the readout data is nonzero, increasing the appearance frequency value at the position of the data; update means for, if a portion where the appearance frequency values are arranged in ascending order exists in the sorting information, updating the sorting information to attain the descending order by replacing two pairs determined to be arranged in the ascending order; determination means for determining, by analyzing the sorting information, the minimum number P ($p \geq 1$) of blocks until execution of replacement processing by the update means; and scan control means for causing P of the plurality of scan conversion means to convert P consecutive block data into a one-dimensional array in parallel.

The present invention in its tenth aspect provides a method of controlling a scan conversion apparatus which includes a plurality of scan conversion means executable in parallel, each scan conversion means sequentially reading out and outputting data in a block of interest in an order of data positions based on sorting information, and if the readout data is nonzero, increasing an appearance frequency value at a position of the data, and repeatedly executes, for run-length encoding, causing at least one scan conversion means to scan two-dimensionally arrayed blocks each having m×n data to convert the data into one-dimensionally arrayed data and outputting the data, comprising: a setting step of setting initial sorting information in which positions of scan target data in the m×n data and statistical appearance frequency values of nonzero at the positions are paired and arranged in descending order of the appearance frequency values of the scan target data; and an update step of updating, if a portion where the appearance frequency values are arranged in ascending order exists in the sorting information, the sorting information to attain the descending order by replacing two pairs determined to be arranged in the ascending order; a determination step of determining, by analyzing the sorting information, the minimum number P ($p \geq 1$) of blocks until execution of replacement processing in the update step; and a scan control step of causing P of the plurality of scan conversion means to convert P consecutive block data into a one-dimensional array in parallel.

According to the present invention, it is possible to increase the number of scan conversion target blocks per unit time by using scan conversion processing of changing the scan order for each block but executing the scan conversion processing in parallel if possible.

Further features of the present invention will become apparent from the following description of exemplary embodiments (with reference to the attached drawings).

BRIEF DESCRIPTION OF DRAWINGS

FIGS. 7A and 7B are views showing a statistical information table and a coefficient position table;

FIG. 13 is a block diagram showing the arrangement of a counter 1033 in FIG. 12;

FIG. 16 is a timing chart of an operation according to the first embodiment;

FIGS. 17A and 17B are a view showing the transition of the scan order (coefficient position) and statistical information in the process step according to the first embodiment;

FIG. 18 is a block diagram showing the arrangement of a parallel scan conversion unit according to the second embodiment;

FIG. 19 is a block diagram showing the arrangement of a parallel number determination unit according to the second embodiment;

FIG. 22 is a timing chart of an operation according to the second embodiment; and FIGS. 23A and 23B are a view showing the transition of the scan order (coefficient position) and statistical information in the process step according to the second embodiment.

BEST MODE FOR CARRYING OUT THE INVENTION

The embodiments of the present invention will now be described with reference to the accompanying drawings. Note that in the embodiments, an example will be described in which encoding is performed using a scan conversion apparatus which performs scan conversion processing of deciding the scan order of a block based on the status of the preceding block. In the example to be described below, an arrangement concerning encoding is used in a compression system mounted on a digital camera or digital camcorder. However, the scan conversion apparatus or image encoding apparatus need not always be mounted on a digital camera or camcorder.

Figure 9:
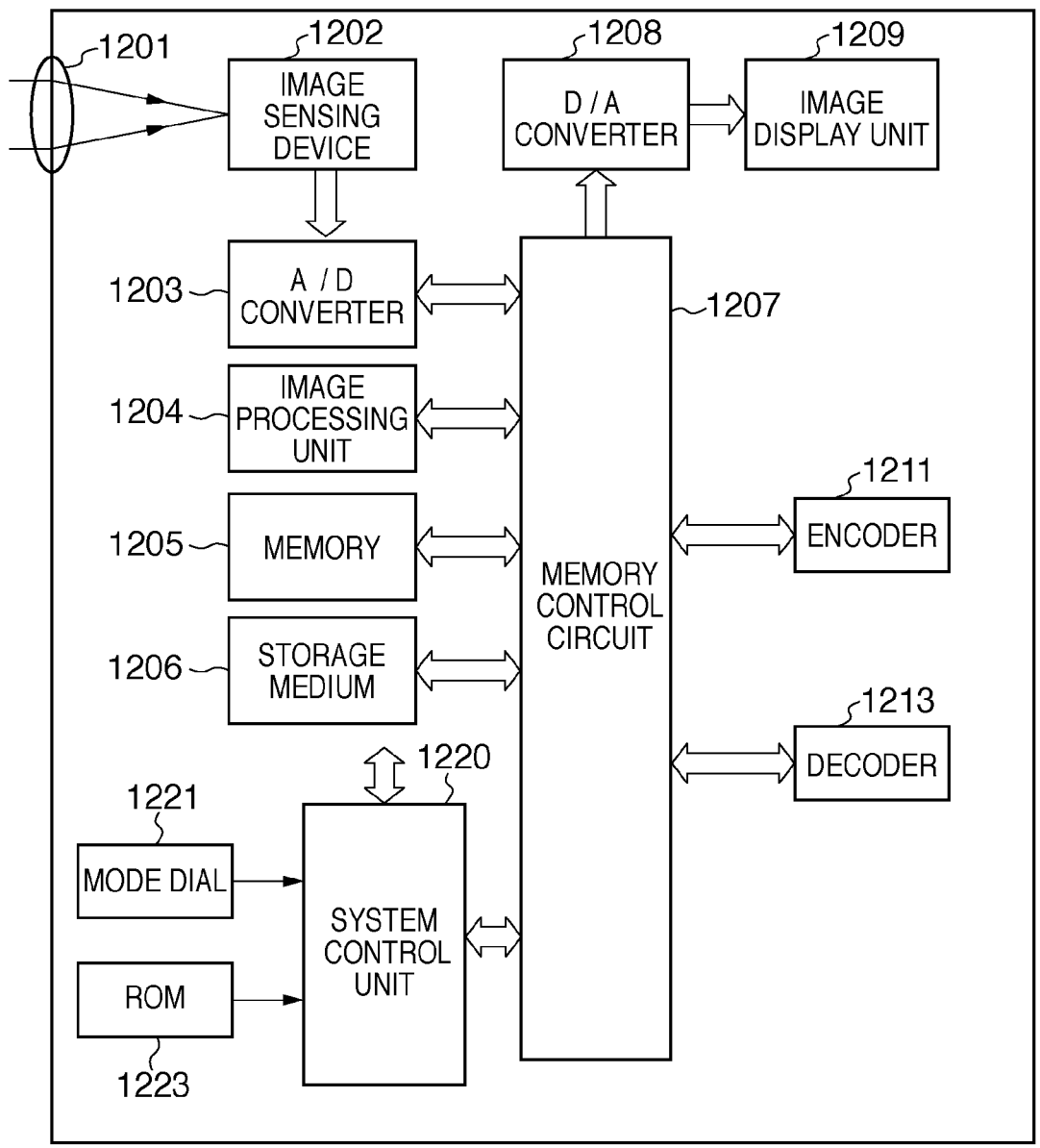
FIG. 9 is a block diagram showing the arrangement of a digital camera applied in the embodiment.

FIG. 9 is a block diagram showing the hardware configuration of a digital camera serving as an image processing apparatus according to the embodiment. A sensing target image is formed on an image sensing device 1202 such as a CCD or CMOS via a lens 1201. The image sensing device 1202 converts the formed image into an analog signal and outputs it to an A/D converter 1203 of the succeeding stage.

The A/D converter 1203 converts the analog signal received from the image sensing device 1202 into a digital signal. A memory control circuit 1207 acquires the converted digital signal from the A/D converter 1203 as data (image data), and outputs the image data to an image processing unit 1204. The image processing unit 1204 executes known image interpolation processing and color conversion processing for the image data.

The memory control circuit 1207 acquires the processed image data from the image processing unit 1204, and stores the acquired image data in a memory 1205. The memory 1205 is configured to temporarily store the data of a sensed still image or moving image, and has an area to store a predetermined number of still images (still images corresponding to a predetermined number of frames). The memory 1205 is read- and write-accessible. The memory control circuit 1207 includes a control unit dedicated to write data in the memory 1205 and read out data from the memory 1205.

The memory control circuit 1207 reads out the image data from the memory 1205 again, and outputs it to a D/A converter 1208 and an encoder 1211. The D/A converter 1208 converts the image data into an analog signal, and outputs the converted analog signal to an image display unit 1209. The image display unit 1209 displays (reproduces), on its display screen, an image (sensed image) represented by the analog signal.

On the other hand, the encoder 1211 generates a code stream (encoded data) from the image data (input image) received from the memory control circuit 1207. The memory control circuit 1207 records the code stream generated by the encoder 1211 in a storage medium 1206 as a file. A removable medium such as an SD card which is detachable from the image processing apparatus is used as the storage medium 1206.

The digital camera has various kinds of switches and buttons, including a mode dial 1221. The mode dial 1221 is used to select an image sensing mode or a reproduction mode. When the user selects the image sensing mode by operating the mode dial 1221, a system control unit 1220 controls the operations of the processing units of the apparatus in accordance with a program stored in a ROM 1223, thereby implementing the above-described processing. More specifically, the system control unit implements processing of causing the image display unit 1209 to display an image based on the data of an image obtained via the lens 1201, and also encoding the image data and recording it as a code stream in the storage medium 1206.

If the user selects the reproduction mode by operating the mode dial 1221, the system control unit 1220 controls the operations of the units of the image processing apparatus, thereby implementing each processing to be explained below.

The memory control circuit 1207 reads out a code stream from an encoded data file recorded in the storage medium 1206, and outputs the readout code stream to a decoder 1213. The decoder 1213 decodes the code stream received from the memory control circuit 1207. The memory control circuit 1207 outputs image data obtained by decoding to the D/A converter 1208. The D/A converter 1208 converts the image data into an analog signal, and outputs the converted analog signal to the image display unit 1209. The image display unit 1209 reproduces (displays), on its display screen, the encoded image data file stored in the storage medium 1206.

Note that the ROM 1223 stores the setting data of the image processing apparatus and computer programs to be executed by the system control unit 1220. The ROM 1223 also stores data to be described below as known data in the following processing. That is, the system control unit 1220 executes processing using the computer programs and data stored in the ROM 1223, thereby controlling the operations of the units of the apparatus. The apparatus according to the embodiment thus implements each processing to be explained below.

Figure 2:
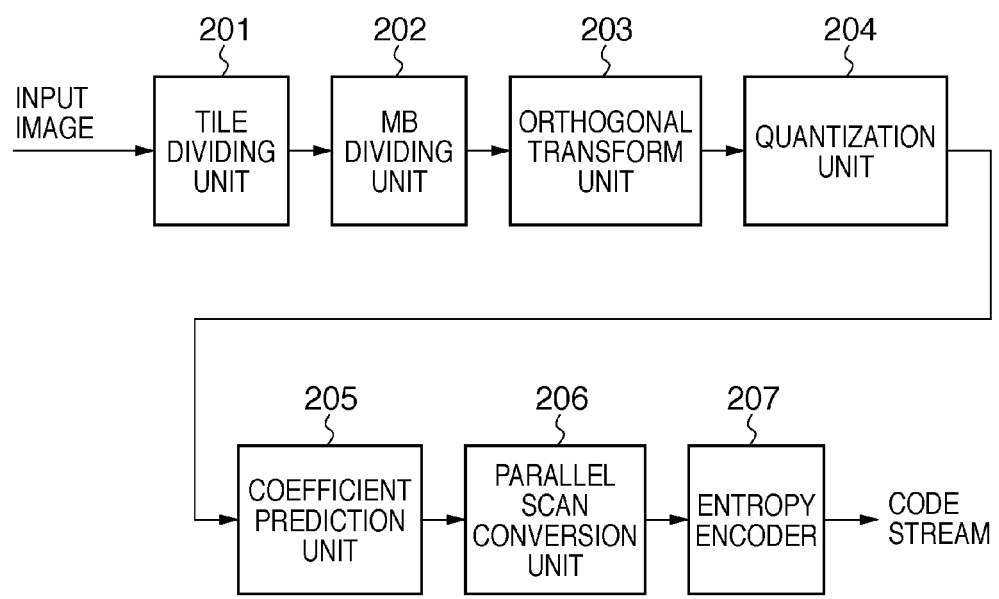
FIG. 2 is a block diagram showing the arrangement of an image encoder according to the present invention.
Figures 3A, 3B, 3C, 4:
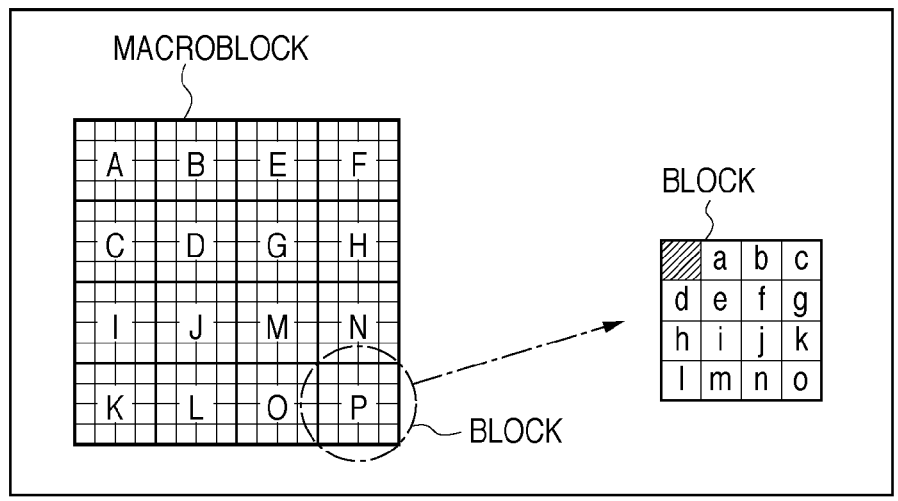
FIGS. 3A to 3C are views showing examples of a scan order.
FIG. 4 is a view showing the relationship between a macroblock and blocks and the correspondence relationship between each data in a block and a character added to its position.
Figure 5:
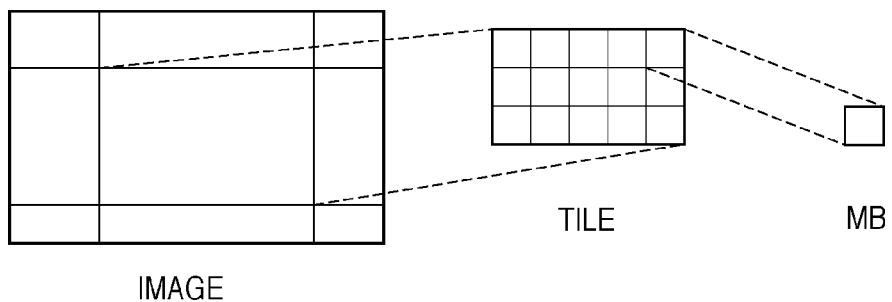
FIG. 5 is a view for explaining image division.

The encoder 1211 will be described next with reference to FIG. 2. FIG. 2 is a block diagram showing an example of the detailed functional arrangement of the encoder 1211. The units shown in FIG. 2 are formed from hardware. However, some or all of them may be implemented by a computer program.

Referring to FIG. 2, a tile dividing unit 201 functions as an image dividing unit configured to divide one input image data. More specifically, the tile dividing unit 201 divides input image data into one or more tiles and sequentially outputs the tiles to an MB dividing unit 202. The MB dividing unit 202 divides one input tile into a plurality of macroblocks (MBs) each serving as the unit of encoding processing, and outputs the divided MBs to an orthogonal transform unit 203. Hence, processing from the orthogonal transform unit 203 is done for each MB.

An encoding operation of encoding one MB will be described below. The same operation is performed even for other MBs. When all MBs in one tile have been processed, the same processing is executed for another tile.

The data of an MB undergoes orthogonal transform of the orthogonal transform unit 203 and is thus converted from color space data to transform coefficients in the frequency space. To allow lossy conversion, a quantization unit 204 quantizes the transform coefficients to lower the resolution, thereby decreasing the data amount. If the data pattern of the image extends across a plurality of blocks, a coefficient prediction unit 205 predicts the quantized transform coefficients (to be simply referred to as transform coefficients hereinafter) in accordance with each frequency band, thereby further decreasing the strength of the transform coefficients. However, when the quantized value changes depending on the coefficient position in a block or between blocks, the coefficient prediction processing may be omitted even if the data pattern of the image extends across a plurality of blocks.

The transform coefficients which have undergone quantization and coefficient prediction are supplied to a parallel scan conversion unit 206 as two-dimensional data. The parallel scan conversion unit 206 scans the two-dimensionally arrayed transform coefficients to sort them into one-dimensionally arrayed data by continuously placing significant coefficients ahead and runs (zeros) behind. An entropy encoder 207 entropy-encodes (run-length encodes) the thus sorted one-dimensional data, thereby generating a code stream.

Figure 8:
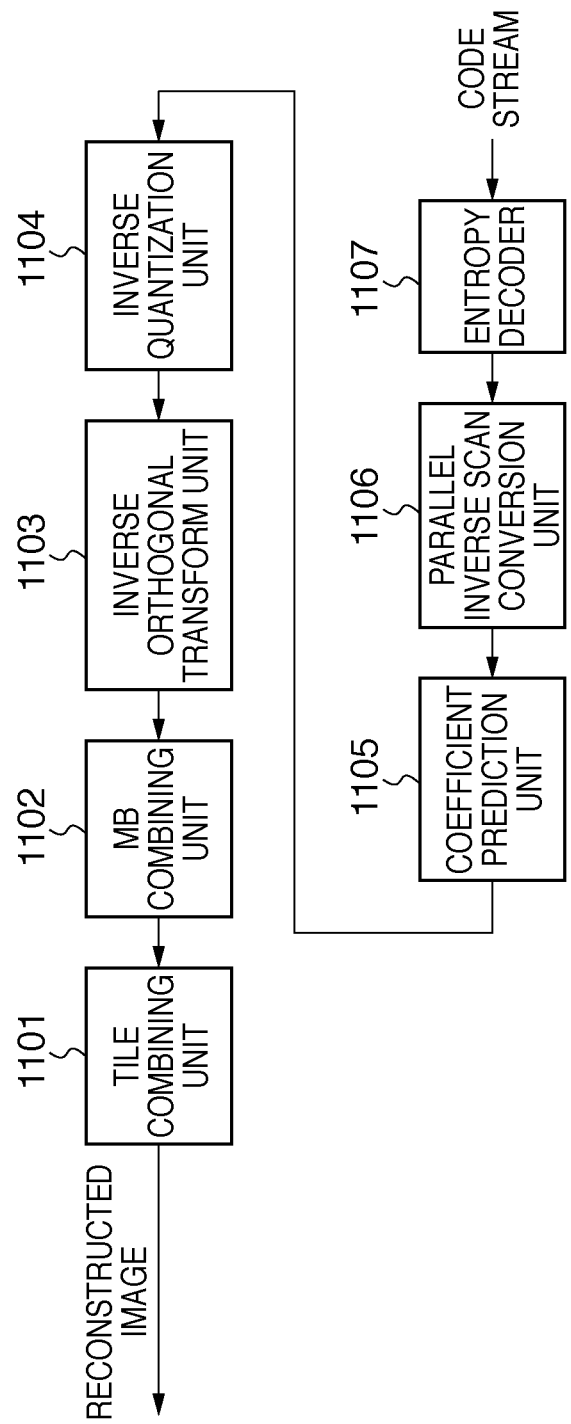
FIG. 8 is a block diagram showing the arrangement of an image decoder.

FIG. 8 is a block diagram showing the arrangement of the decoder 1213. As shown in FIG. 8, the decoder 1213 includes an entropy decoder 1107, parallel inverse scan conversion unit 1106, coefficient prediction unit 1105, inverse quantization unit 1104, inverse orthogonal transform unit 1103, MB combining unit 1102, and tile combining unit 1101. The contents of processes of these processing units are reverse to those in the encoder 1211 shown in FIG. 2, and a detailed description thereof will be omitted.

For the encoding scheme capable of changing the quantized value or intra-frame prediction method for each block, a method of changing the scan order for each block is suitable. Two embodiments will be explained below in detail, which implement the parallel scan conversion unit 206 capable of executing scan conversion of two or more blocks in parallel to increase the process speed.

First Embodiment

Figure 1:
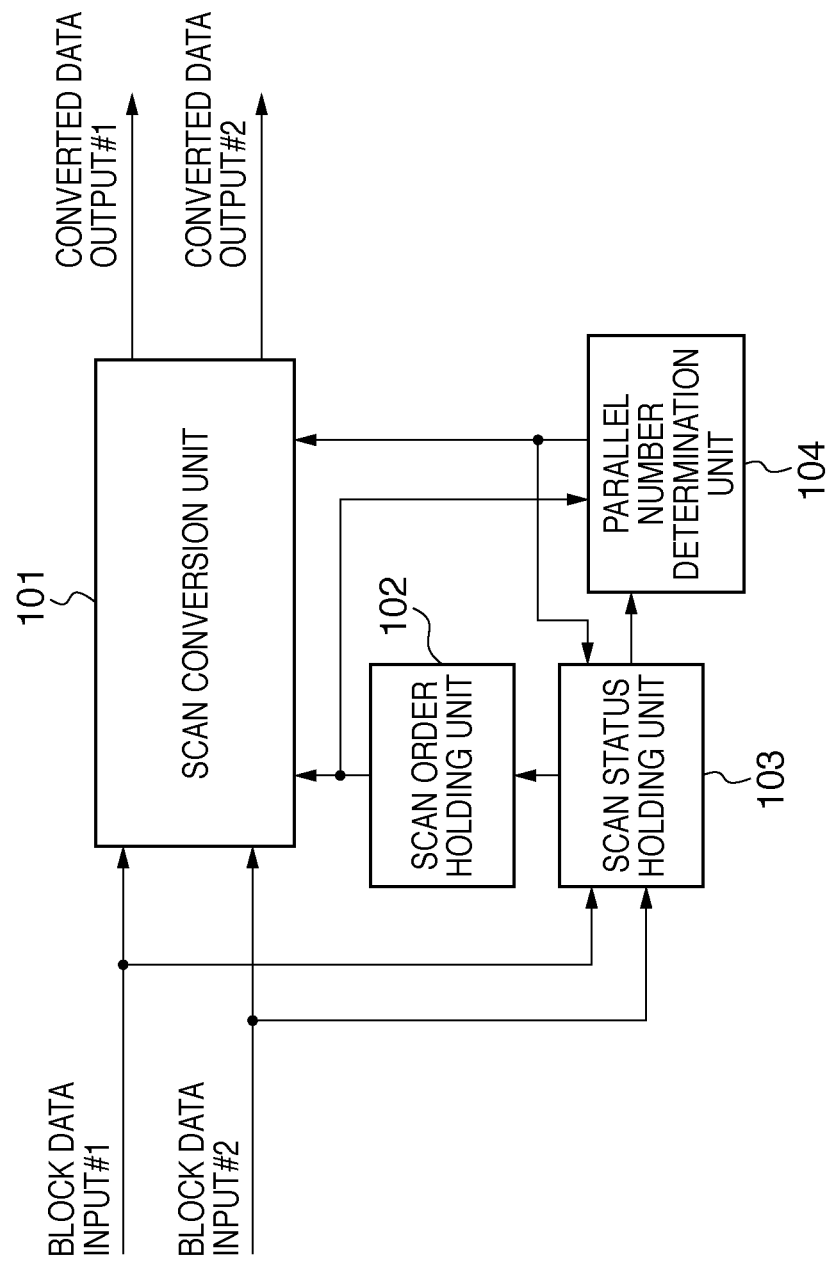
FIG. 1 is a block diagram showing the arrangement of a parallel scan conversion unit according to the first embodiment.

FIG. 1 illustrates the arrangement of a parallel scan conversion unit 206. The parallel scan conversion unit 206 includes a scan conversion unit 101, scan order holding unit 102, scan status holding unit 103, and parallel number determination unit 104. The scan conversion unit 101 is assumed to execute two scan conversion processes in parallel for the descriptive convenience. However, three or more scan conversion processes may be executed in parallel, as is apparent from the following explanation. The parallel scan conversion unit 206 will be described in detail with reference to FIG. 1.

The scan conversion unit 101 receives two consecutive block data inputs #1 and #2, performs scan conversion (sort processing), and outputs converted data outputs #1 and #2. The scan conversion unit 101 executes scan conversion of block data inputs #1 and #2 in accordance with scan order information received from the scan order holding unit 102. The scan conversion unit 101 outputs only converted data output #1 or both of converted data outputs #1 and #2 in accordance with a parallel process control signal received from the parallel number determination unit 104.

Based on information output from the scan status holding unit 103, the scan order holding unit 102 performs the above-described conversion processing as needed, and generates and holds scan order information representing the scan order. The scan order holding unit 102 outputs the generated scan order information to the scan conversion unit 101 and the parallel number determination unit 104. The scan status holding unit 103 receives block data inputs #1 and #2, generates and holds a scan status and a next scan status, and outputs the next scan status to the scan order holding unit 102 and the scan status to the parallel number determination unit 104.

The parallel number determination unit 104 functions as a scan control unit configured to control the operation of the scan conversion unit 101. More specifically, the parallel number determination unit 104 receives the scan order information output from the scan order holding unit 102 and the scan status output from the scan status holding unit 103. The parallel number determination unit 104 generates a parallel process control signal by analyzing these pieces of information, and outputs the control signal to the scan conversion unit 101 and the scan status holding unit 103.

The contents of processing of the parallel scan conversion unit 206 according to this embodiment will be described next with reference to the timing chart of FIG. 16, the status explanatory view of FIGS. 17A and 17B, and FIG. 1.

FIG. 16 shows changes in the statuses of the respective units from block data input to converted data output in periods of Terms 1 to 5. In Term 1, blocks A and B are supplied to each of the scan conversion unit 101 and the scan status holding unit 103 as block data #1 and #2. In Term 1, the scan order information held in the scan order holding unit 102 and the scan status held in the scan status holding unit 103 are in the initial status.

Figure 6:
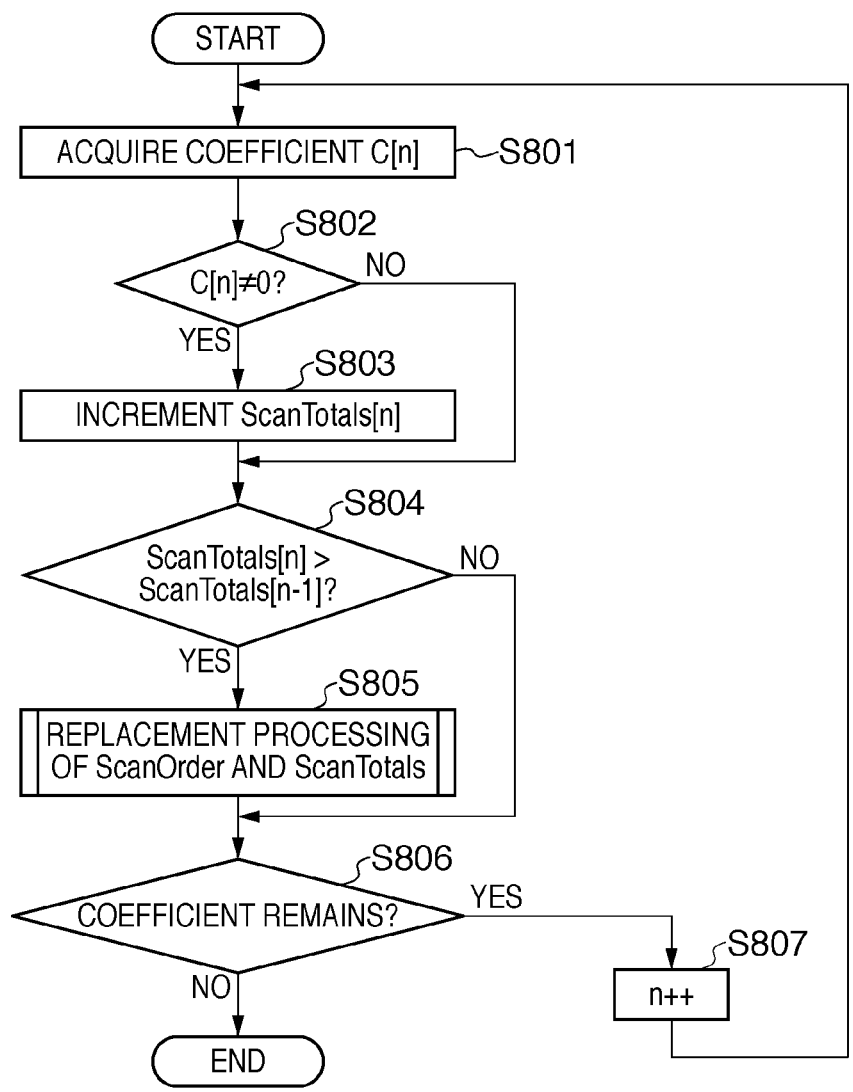
FIG. 6 is a flowchart of scan order decision processing.

In this embodiment, the initial scan order information held in the scan order holding unit 102 represents the coefficient positions shown in FIG. 7B. However, the scan order information is not limited to this and can be any other information using an expression capable of specifying the scan order. Similarly, in this embodiment, the initial scan status (the initial appearance frequency values of the coefficients) held in the scan status holding unit 103 represents the statistically obtained information shown in FIG. 7A. However, the scan status is not limited to this and can be any other information to be used to decide the scan order. Note that the pieces of the statistical information are arranged in the order (descending order) of appearance frequency value, as shown in FIG. 7A. In this embodiment, the scan order and statistical information are decided based on the method of deciding the coefficient positions (ScanOrder) and statistical information (ScanTotals) shown in FIG. 6. However, the deciding method is not limited to this.

Figure 17B:

FIGS. 17A and 17B show the coefficient position data held in the scan order holding unit 102, the statistical information held in the scan status holding unit 103, and the statuses of block inputs #1 and #2 during the periods of Terms 1 to 5 in FIG. 16. In Term 1, the coefficient positions and statistical information are initialized as shown in FIGS. 17A and 17B. Assume that the blocks A and B having values shown in FIG. 17A are input. In FIGS. 17A and 17B, coefficient positions corresponding to significant coefficients (coefficients having values other than 0) appearing in the input blocks are marked with full circles and open circles for the purpose of reference. The full circles correspond to significant coefficient positions in block input #1. The open circles correspond to significant coefficient positions in block input #2.

In the statistical information status of Term 1, the value of statistical information corresponding to each scan order never becomes larger than the value of statistical information corresponding to the preceding order independently of the positions of significant coefficients generated in the blocks. For this reason, both the blocks A and B can undergo scan conversion in the same scan order. Based on the coefficient position information output from the scan order holding unit 102 and the statistical information output from the scan status holding unit 103, the parallel number determination unit 104 determines that parallel processing is possible, and outputs a signal representing a parallel process instruction to the scan conversion unit 101.

Figure 15:
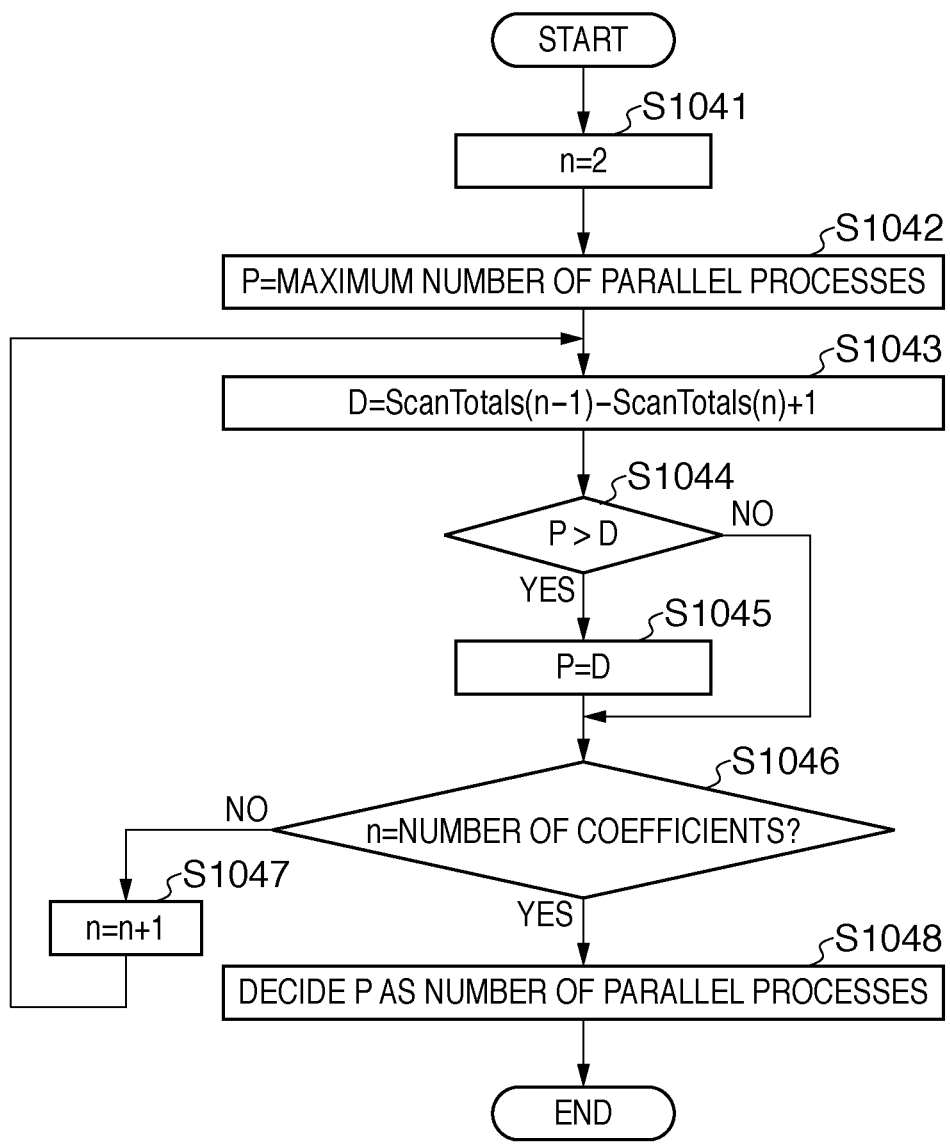
FIG. 15 is a flowchart of parallel number determination processing of the parallel number determination unit according to the first embodiment.

The parallel number determination processing of the parallel number determination unit 104 will be described here with reference to the procedure shown in FIG. 15.

When processing starts, 2 is substituted into a variable n in process S1041. In process S1042, the maximum number of parallel processes ("2" in this embodiment) is set in P to be used to decide the number of parallel processes. After that, a difference D between two pieces of consecutive statistical information is calculated in process S1043.

$$D = \text{ScanTotals}(n-1) - \text{ScanTotals}(n) + 1$$

In determination process S1044, the values P and D are compared. If it is determined that $P \leq D$, ScanTotals(n) never becomes larger than ScanTotals(n−1) in the statistical information even when the two blocks undergo scan processing.

On the other hand, if it is determined that $P>D$, scan processing of the two blocks generates data in ascending order in the statistical information, and the order needs to be changed to the descending order. More specifically, the scan order needs to be changed to reduce the maximum parallel number. To do this, the value of the variable D is substituted into the variable P in process S1045.

After that, in determination process S1046, it is determined whether the variable n equals the number of coefficients in a block. If NO, the value of the variable n is incremented (increased) in process S1047, and the process returns to process S1043. Note that in this embodiment, one block has a size of 4×4 pixels, and the scan target (sort target) includes 15

AC components other than one DC component in the block. Hence, the number of scan conversion target coefficients in the block is "15".

If YES in determination process S1046, all pieces of statistical information have been inspected, and the process advances to process S1048. In process S1048, the value P indicates the minimum number of blocks until execution of replacement processing. More specifically, this indicates that the data in P blocks can undergo scan conversion in parallel. Hence, the number of executable parallel processes can be decided as P.

Note that when the pieces of statistical information have the initial status shown in FIG. 17A, the difference between two pieces of consecutive statistical information ScanTotals (n−1) and ScanTotals(n) is "2". Theoretically, it is possible to execute three scan conversion processes in parallel. In the embodiment, however, the number of parallel processes executable by the scan conversion unit 101 is two, as shown in FIG. 1. Hence, in process S1048, P=2 is determined. As is apparent from the above description, the flowchart of FIG. 15 obtains, for n=2, 3, . . . , 15, a portion where ScanTotals(n−1) and ScanTotals(n) are minimized and the difference between them, thereby obtaining the number of parallel processes.

Revert to the description of Term 1. In Term 1, the scan conversion unit 101 sorts the scan orders of the input blocks A and B in accordance with the coefficient position information output from the scan order holding unit 102 and the parallel control signal output from the parallel number determination unit 104. In Term 1, the parallel control signal output from the parallel number determination unit 104 indicates parallel processing. Hence, the blocks A and B undergo sort processing in parallel in accordance with the coefficient position information output from the scan order holding unit 102.

In Term 2, blocks C and D are respectively input as block data #1 and #2 to each of the scan conversion unit 101 and the scan status holding unit 103. Since parallel processing has been executed in Term 1, and the coefficients at the positions indicated by full and open circles in FIGS. 17A and 17B are significant coefficients, the pieces of statistical information at the corresponding positions in the scan status holding unit 103 are updated to values as indicated by Term 2 in FIG. 17A. Since replacement of coefficient positions has not occurred upon inputting the blocks A and B, the coefficient position information in the scan order holding unit 102 does not change in Term 2. Based on the coefficient position information output from the scan order holding unit 102 and the statistical information output from the scan status holding unit 103, the parallel number determination unit 104 determines in accordance with the procedure shown in FIG. 15 whether to execute parallel processing, and outputs a control signal to the scan conversion unit 101 and the scan status holding unit 103. In Term 2, a portion where the scan orders can replace each other exists, as indicated by Term 2 in FIG. 17A. Hence, the parallel number determination unit 104 outputs a parallel control signal indicating sequential processing. In Term 2, since the parallel control signal indicates sequential processing, the scan status holding unit 103 updates, out of the pieces of currently held statistical information, only information corresponding to the significant coefficients of the input block C, and outputs the information to the scan order holding unit 102 as the next statistical information. The positions corresponding to the significant coefficients of the input block C to be updated are indicated by full circles in Term 2 of FIG. 17A. The scan order holding unit 102 decides the coefficient position information using the statistical information in the next status output from the scan status holding unit 103. In Term 2, the scan conversion unit 101 outputs the results of scan conversion processing of the blocks A and B in Term 1 as converted data outputs #1 and #2. Since the parallel control signal output from the parallel number determination unit 104 indicates sequential processing, the scan conversion unit 101 sorts only the block C in accordance with the coefficient position information output from the scan order holding unit 102.

In Term 3, blocks D and E are respectively input as block data #1 and #2 to each of the scan conversion unit 101 and the scan status holding unit 103. Since sequential processing has been executed in Term 2, and the coefficients at the positions indicated by full circles in FIGS. 17A and 17B are significant coefficients of the block C, the pieces of statistical information at the corresponding positions in the scan status holding unit 103 are updated to values as indicated by Term 3 in FIG. 17A. Since replacement of coefficient positions has occurred upon inputting the block C, the coefficient position information in the scan order holding unit 102 is updated as indicated by Term 3 in FIG. 17A. In Term 3, no portion where the scan orders can replace each other in the next status exists. Hence, the parallel number determination unit 104 outputs a parallel control signal indicating parallel processing (P=2) to the scan conversion unit 101 and the scan status holding unit 103 in accordance with the procedure shown in FIG. 15. In Term 3, since the parallel control signal indicates parallel processing, the scan status holding unit 103 updates, out of the pieces of currently held statistical information, information corresponding to the significant coefficients of the input blocks D and E, and outputs the information to the scan order holding unit 102 as the next statistical information. The positions corresponding to the significant coefficients of the input blocks D and E to be updated are indicated by full and open circles in Term 3 of FIG. 17A. The scan order holding unit 102 decides the coefficient position information using the statistical information in the next status output from the scan status holding unit 103. In Term 3, the scan conversion unit 101 outputs the result of scan conversion processing of the block C in Term 2 as converted data output #1. The scan conversion unit 101 also holds the result of the scan conversion processing of the block B and outputs it as converted data output #2. Since the parallel control signal output from the parallel number determination unit 104 indicates parallel processing, the scan conversion unit 101 sorts the blocks D and E in parallel in accordance with the coefficient position information output from the scan order holding unit 102.

In Term 4, blocks F and G are respectively input as block data #1 and #2 to each of the scan conversion unit 101 and the scan status holding unit 103. Since parallel processing has been executed in Term 3, and the coefficients at the positions indicated by full and open circles in FIGS. 17A and 17B are significant coefficients, the pieces of statistical information at the corresponding positions in the scan status holding unit 103 are updated to values as indicated by Term 4 in FIG. 17B. Since replacement of coefficient positions has not occurred upon inputting the blocks D and E, the coefficient position information in the scan order holding unit 102 does not change in Term 4. Based on the coefficient position information output from the scan order holding unit 102 and the statistical information output from the scan status holding unit 103, the parallel number determination unit 104 outputs a parallel control signal to the scan conversion unit 101 and the scan status holding unit 103 in accordance with the procedure shown in FIG. 15. In Term 4, a portion where the scan orders can replace each other exists, as indicated by Term 4 in FIG. 17B. Hence, the parallel number determination unit 104 outputs a parallel control signal indicating sequential processing. In Term 4, since the parallel control signal indicates sequential processing, the scan status holding unit 103 updates, out of the pieces of currently held statistical information, only information corresponding to the significant coefficients of the input block F, and outputs the information to the scan order holding unit 102 as the next statistical information. The positions corresponding to the significant coefficients of the input block F to be updated are indicated by full circles in Term 4 of FIG. 17B. The scan order holding unit 102 decides the coefficient position information using the statistical information in the next status output from the scan status holding unit 103. In Term 4, the scan conversion unit 101 outputs the results of scan conversion processing of the blocks D and E in Term 3 as converted data outputs #1 and #2. Since the parallel control signal output from the parallel number determination unit 104 indicates sequential processing, the scan conversion unit 101 sorts only the block F in accordance with the coefficient position information output from the scan order holding unit 102.

In Term 5, blocks G and H are respectively input as block data #1 and #2 to each of the scan conversion unit 101 and the scan status holding unit 103. Since sequential processing has been executed in Term 4, and the coefficients at the positions indicated by full circles in FIGS. 17A and 17B are significant coefficients of the block F, the pieces of statistical information at the corresponding positions in the scan status holding unit 103 are updated to values as indicated by Term 5 in FIG. 17B. Since replacement of coefficient positions has not occurred upon inputting the block F, the coefficient position information in the scan order holding unit 102 does not change in Term 5. In Term 5, no portion where the scan orders can replace each other in the next status exists. Hence, the parallel number determination unit 104 outputs a parallel control signal indicating parallel processing to the scan conversion unit 101 and the scan status holding unit 103 in accordance with the procedure shown in FIG. 15. In Term 5, since the parallel control signal indicates parallel processing, the scan status holding unit 103 updates, out of the pieces of currently held statistical information, information corresponding to the significant coefficients of the input blocks G and H, and outputs the information to the scan order holding unit 102 as the next statistical information. The positions corresponding to the significant coefficients of the input blocks G and H to be updated are indicated by full and open circles in Term 5 of FIG. 17B. The scan order holding unit 102 decides the coefficient position information using the statistical information in the next status output from the scan status holding unit 103. In Term 5, the scan conversion unit 101 outputs the result of scan conversion processing of the block F in Term 4 as converted data output #1. The scan conversion unit 101 also holds the result of the scan conversion processing of the block E and outputs it as converted data output #2. Since the parallel control signal output from the parallel number determination unit 104 indicates parallel processing, the scan conversion unit 101 sorts the blocks G and H in parallel in accordance with the coefficient position information output from the scan order holding unit 102.

The scan conversion processing is repeated in the same way.

The arrangements and operations of the units according to the embodiment will be described next. The internal arrangement and operation of the scan conversion unit 101 will be explained first with reference to FIG. 10.

Figure 10:
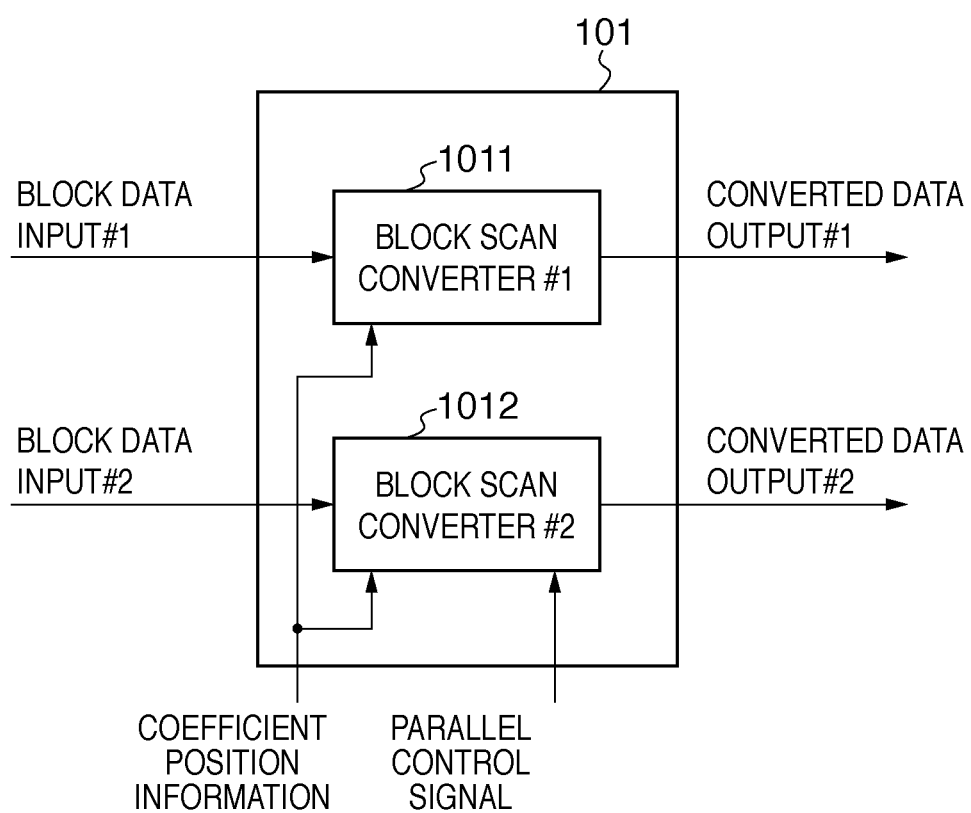
FIG. 10 is a block diagram showing the arrangement of a scan conversion unit according to the first embodiment.

FIG. 10 is a block diagram showing an example of the internal arrangement of the scan conversion unit 101. A block scan converter #1 1011 sorts, in accordance with the coefficient position information, data in a block of interest input as block data input #1, and outputs the data as converted data output #1 in the next cycle. Similarly, a block scan converter #2 1012 sorts block data input #2 in accordance with the coefficient position information and, if the parallel control signal indicates a parallel process instruction, outputs the data as converted data output #2 in the next cycle. If the parallel control signal indicates a sequential process instruction, the block scan converter #2 1012 holds the value in the preceding cycle and outputs it as converted data output #2.

Figure 11:
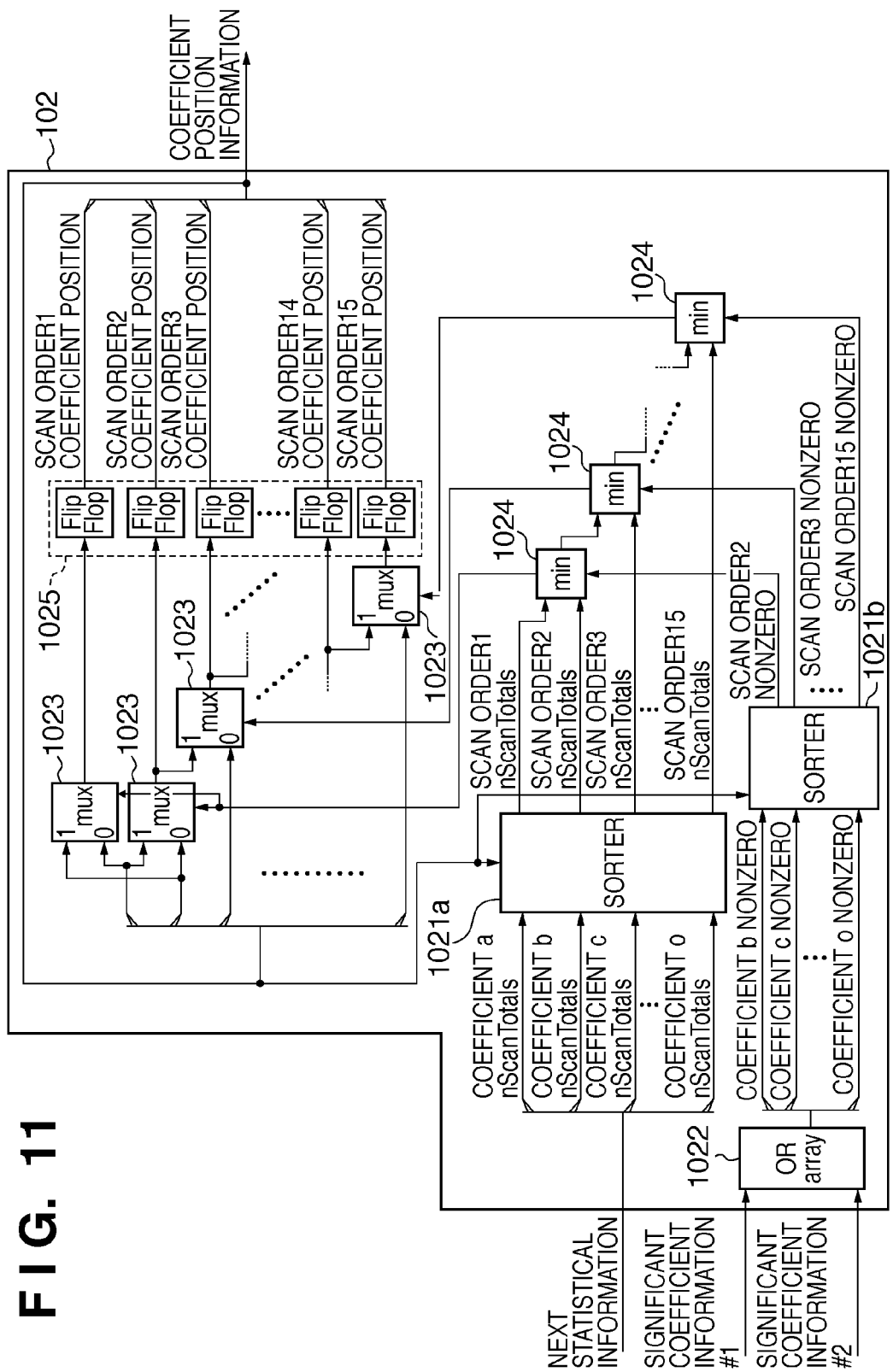
FIG. 11 is a block diagram showing the arrangement of a scan order holding unit according to the first embodiment.

The internal arrangement and operation of the scan order holding unit 102 will be described next with reference to FIG. 11.

A sorter 1021a sorts nScanTotals representing the next statistical information in accordance with the coefficient position information based on the scan orders 1 to 15 and outputs the information. A sorter 1021b sorts nonzero information of coefficients b to o in accordance with the coefficient position information based on the scan orders 2 to 15 and outputs the information. A logic OR array 1022 logically ORs significant coefficient information #1 of the coefficients b to o and significant coefficient information #2 of the coefficients b to o, and outputs the nonzero information of the coefficients b to o. Each multiplexer 1023 selectively outputs one of inputs "1" and "0" in FIG. 11 in accordance with a selection signal. In this embodiment, when the selection signal is "1", input "1" is selected and output. When the selection signal is "0", input "0" is selected and output. If nonzero information output from the sorter 1021b indicates nonzero, a comparator 1024 receives and compares, out of nScanTotals output from the sorter 1021a, two values adjacent in the scan order, and outputs a smaller one. If nonzero information output from the sorter 1021b does not indicate nonzero, the comparator 1024 outputs preceding nScanTotals in the scan order. If nonzero information output from the sorter 1021b indicates nonzero, and preceding nScanTotals in the scan order is small, the comparator 1024 outputs "1" as the selection signal to the multiplexer 1023. Otherwise, the comparator 1024 outputs "0". A flip-flop 1025 receives the outputs from the multiplexers 1023, and holds and outputs them as the coefficient position information of the scan orders 1 to 15.

Figure 12:
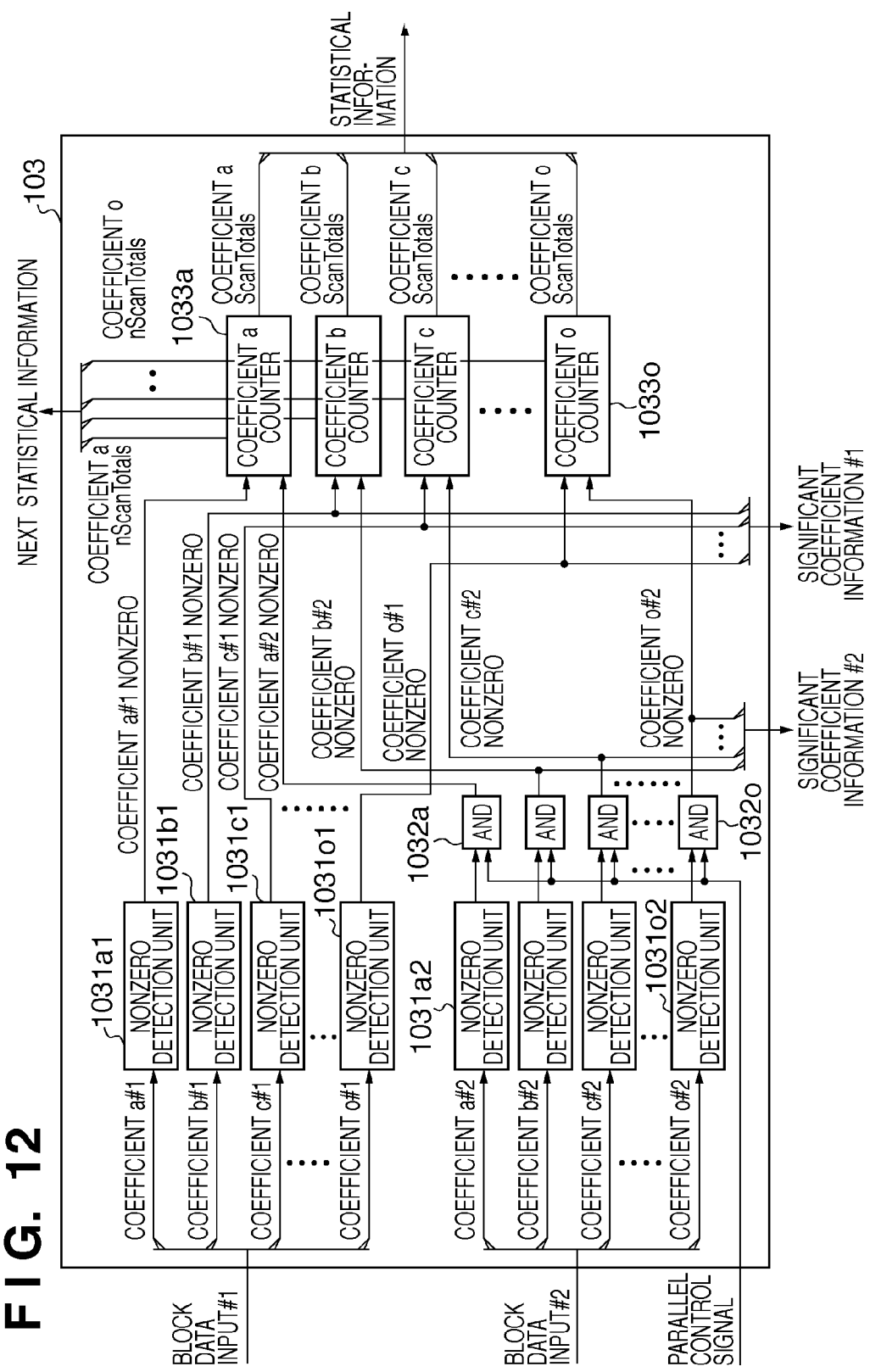
FIG. 12 is a block diagram showing the arrangement of a scan status holding unit according to the first embodiment.

The internal arrangement and operation of the scan status holding unit 103 will be described next with reference to FIG. 12.

Block input data #1 and #2 are split into coefficients a #1 to o #1 and a #2 to o #2, and the coefficients are input to nonzero detection units 1031a1 to 1031o1 and 1031a2 to 1031o2, respectively. The nonzero detection units 1031a1 to 1031o1 determine whether the coefficients a #1 to o #1 are 0, respectively, and output the determination results as the nonzero signals of the coefficients a #1 to o #1. In this embodiment, "1" is output as a nonzero signal representing nonzero. Otherwise, "0" is output. The nonzero detection units 1031a2 to 1031p2 determine whether the coefficients a #2 to o #2 are 0, respectively, and output "1" for nonzero or "0" otherwise. Logic AND gates 1032a to 1032o logically AND the outputs from the nonzero detection units 1031a2 to 1031o2 and the input parallel control signal, and output the nonzero signals of the coefficients a #2 to o #2. In this embodiment, the parallel control signal indicates a parallel process instruction by "1" and a sequential process instruction by "0". More specifically, when the parallel control signal indicates a sequential process instruction, all the nonzero signals of the coefficients a #2 to o #2 are masked by "0". The nonzero signals of the coefficients a #1 to o #1 and the coefficients a #2 to o #2 are output to the outside as significant coefficient information #1 and #2, respectively. Counters 1033a to 1033o hold ScanTotals corresponding to the coefficients a to o, respectively. The counter 1033a receives the nonzero signals of the coefficients a #1 and a #2, counts up the internal status of each signal based on its status, and outputs ScanTotals.

FIG. 13 is a block diagram showing an example of the internal arrangement common to the counters 1033a to 1033o. A flip-flop 10331 holds and outputs ScanTotals of a corresponding coefficient. An adder 10332 adds "1" to the output from the flip-flop 10331 and outputs the addition result to a multiplexer 10334. An adder 10333 adds "2" to the output from the flip-flop 10331 and outputs the addition result to the multiplexer 10334. The multiplexer 10334 selectively outputs the output from the flip-flop 10331, the output from the adder 10332, or the output from the adder 10333 to the flip-flop 10331 in accordance with the statuses of #1 nonzero input and #2 nonzero input. The output from the multiplexer 10334 is output to the outside as "nScanTotals" as the next status of ScanTotals. When #1 nonzero input is "1", and #2 nonzero input is "0", the multiplexer 10334 selects and outputs the output from the adder 10332. When both inputs are "1", the multiplexer 10334 selects and outputs the output from the adder 10333. Otherwise, the multiplexer 10334 selects and outputs the output from the flip-flop 10331. Like the counter 1033a, the remaining counters 1033b to 1033o receive the nonzero signals of the coefficients b #1 to o #1 and the nonzero signals of the coefficients b #2 to o #2, respectively, count up the internal statuses of the signals based on their statuses, and output ScanTotals. ScanTotals of the coefficients a to o output from the counters 1033a to 1033o are output to the outside as the next statistical information. ScanTotals of the coefficients a to o output from the counters 1033a to 1033o are also output to the outside as the statistical information.

Figure 14:
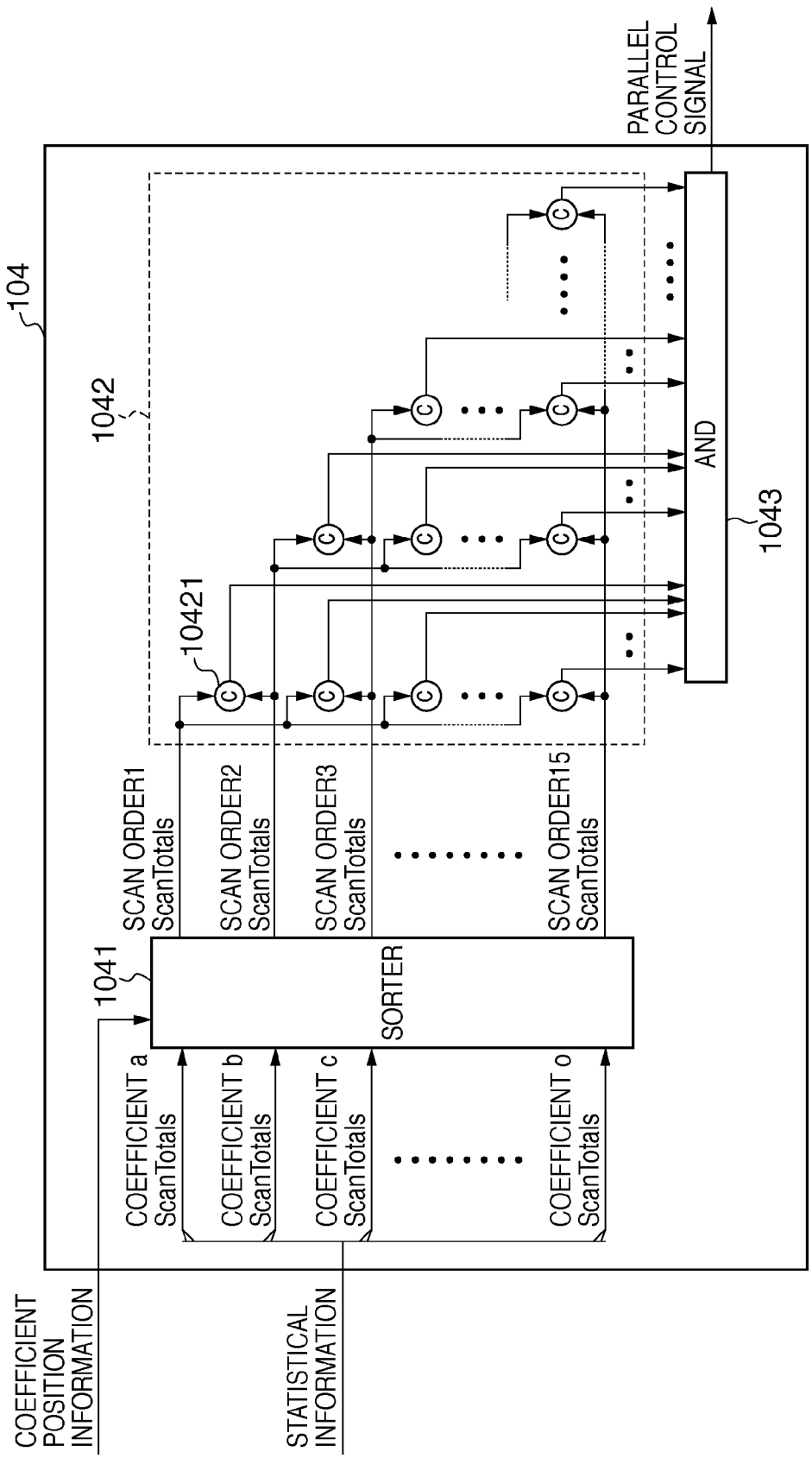
FIG. 14 is a block diagram showing the arrangement of a parallel number determination unit according to the first embodiment.

The internal arrangement and operation of the parallel number determination unit 104 will be described next with reference to FIG. 14.

The statistical information is split into ScanTotals of the coefficients a to o and input to a sorter 1041. The sorter 1041 sorts the ScanTotals of the coefficients a to o in accordance with the coefficient position information based on the scan orders 1 to 15 and outputs the ScanTotals to a comparator 1042. The comparator 1042 compares the ScanTotals of the scan orders 1 to 15 and outputs the comparison result to a logic AND gate 1043. The comparator 1042 is formed by connecting a plurality of comparators 10421 as illustrated. If a value obtained by subtracting "1" from the input value from the upper side of FIG. 14 is smaller than the input value from the lower side, the comparator 10421 outputs "0" to the logic AND gate 1043 as a comparison result. Otherwise, "1" is output. The logic AND gate 1043 logically ANDS the comparison results of all the comparators 10421, which are output from the comparator 1042, and outputs the logic AND to the outside as a parallel control signal. In this case, the parallel control signal indicates a parallel process instruction by "1" and a sequential process instruction by "0".

Second Embodiment

The arrangement of a parallel scan conversion unit 206 according to the second embodiment will be described next with reference to the block diagram of FIG. 18.

The same reference numerals as in FIG. 1 denote parts having the same functions in FIG. 18. Hence, a scan conversion unit 101 receives two consecutive block data inputs #1 and #2, performs scan conversion, and outputs converted data outputs #1 and #2. The scan conversion unit 101 is connected to a scan order holding unit 102 and a parallel number determination unit 2104. The scan conversion unit 101 executes scan conversion of block data inputs #1 and #2 in accordance with scan order information received from the scan order holding unit 102. The scan conversion unit 101 outputs only converted data output #1 or both of converted data outputs #1 and #2 in accordance with a parallel process control signal received from the parallel number determination unit 2104. Based on information output from a scan status holding unit 103, the scan order holding unit 102 generates and holds scan order information representing the scan order, and outputs the scan order information to the scan conversion unit 101, the parallel number determination unit 2104, and a significant data position information generation unit 2105. The scan status holding unit 103 receives block data inputs #1 and #2, generates and holds a scan status and a next scan status, and outputs the next scan status to the scan order holding unit 102 and the scan status to the parallel number determination unit 2104. The parallel number determination unit 2104 receives the scan order information output from the scan order holding unit 102, the scan status output from the scan status holding unit 103, and significant data position information output from the significant data position information generation unit 2105. The parallel number determination unit 2104 generates a parallel process control signal based on these pieces of information, and outputs it to the scan conversion unit 101 and the scan status holding unit 103. The significant data position information generation unit 2105 receives block data input #1 and the scan order information output from the scan order holding unit 102, arranges, based on the scan order, pieces of information each representing whether a corresponding coefficient is a significant coefficient, and outputs them to the parallel number determination unit 2104 as significant data position information.

The operation of the parallel scan conversion unit 206 according to the second embodiment will be described next with reference to the timing chart of FIG. 22, the status explanatory view of FIGS. 23A and 23B, and FIG. 18.

FIG. 22 shows changes in the statuses of the respective units from block data input to converted data output in periods of Terms 1 to 5. In Term 1, blocks A and B are respectively input as block data #1 and #2 to each of the scan conversion unit 101 and the scan status holding unit 103. In Term 1, the block A is also input to the significant data position information generation unit 2105. In Term 1, the scan order information held in the scan order holding unit 102 and the scan status held in the scan status holding unit 103 are in the initial status. The operations of the scan order holding unit 102 and the scan status holding unit 103 according to the second embodiment and meanings of information handled in them are the same as those in the first embodiment, and a description thereof will not be repeated.

Figure 23A:
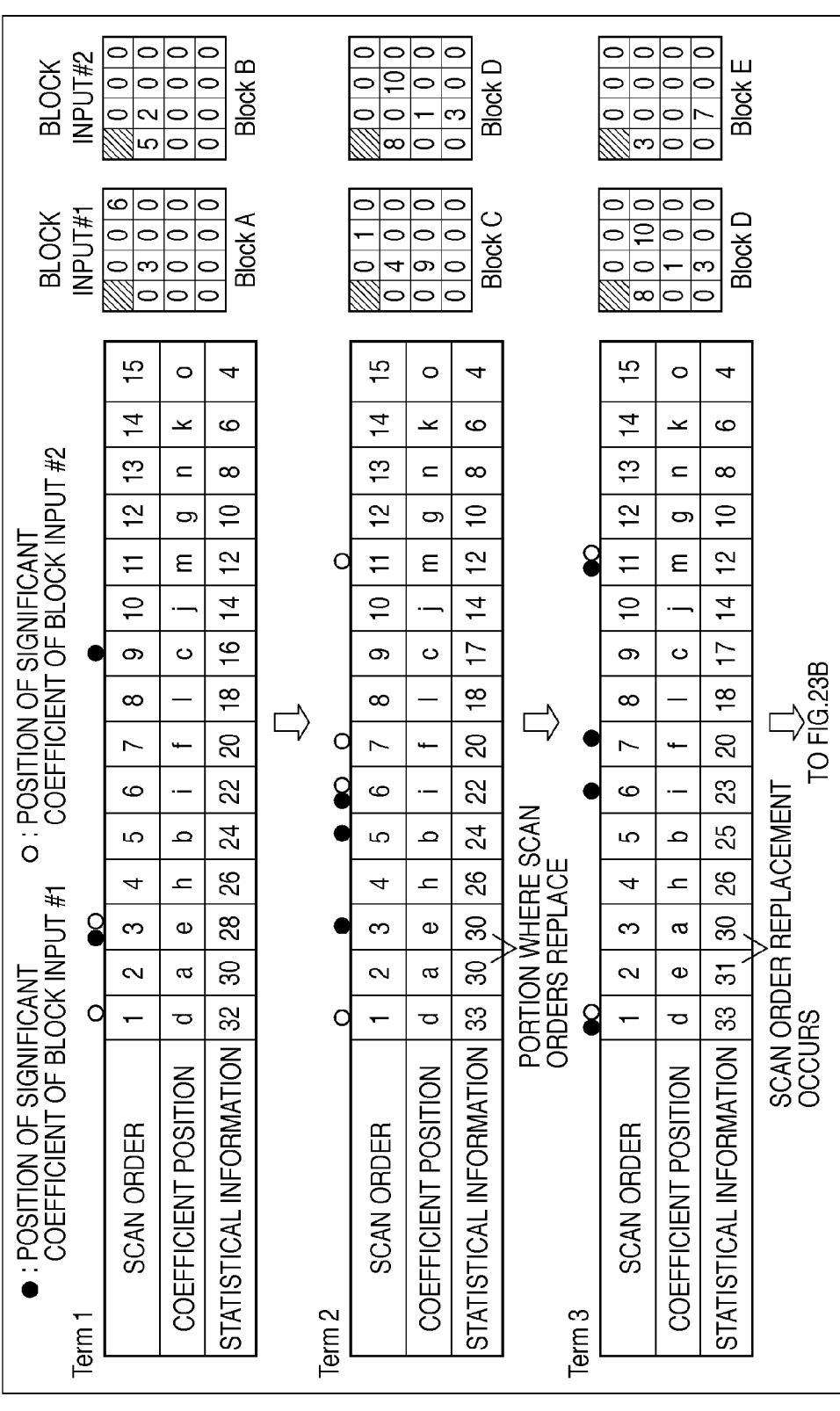

FIGS. 23A and 23B show the coefficient positions held in the scan order holding unit 102, the statistical information held in the scan status holding unit 103, and the statuses of block inputs #1 and #2 during the periods of Terms 1 to 5 in FIG. 22. In Term 1, the coefficient positions and statistical information are initialized as shown in FIG. 23A. Assume that the blocks A and B having values shown in FIG. 23A are input. In FIGS. 23A and 23B, coefficient positions corresponding to significant coefficients appearing in the input blocks are marked with full circles and open circles for the purpose of reference, as in FIGS. 17A and 17B. The meanings of full and open circles are the same as in FIGS. 17A and 17B.

In the statistical information status of Term 1, the value of statistical information corresponding to each scan order never becomes larger than the value of statistical information corresponding to the preceding order independently of the positions of significant coefficients generated in the blocks. For this reason, both the blocks A and B can undergo scan conversion in the same scan order. In Term 1, the significant data position information generation unit 2105 generates pieces of information each representing whether a corresponding coefficient in the block A is a significant coefficient, arranges them based on the scan order in accordance with the coefficient position information output from the scan order holding unit 102, and outputs the information to the parallel number determination unit 2104 as significant coefficient position information. Based on the coefficient position information output from the scan order holding unit 102, the statistical information output from the scan status holding unit 103, and the significant coefficient position information output from the significant data position information generation unit 2105, the parallel number determination unit 2104 determines that parallel processing is possible, and outputs a signal representing a parallel process instruction to the scan conversion unit 101.

Figure 20:
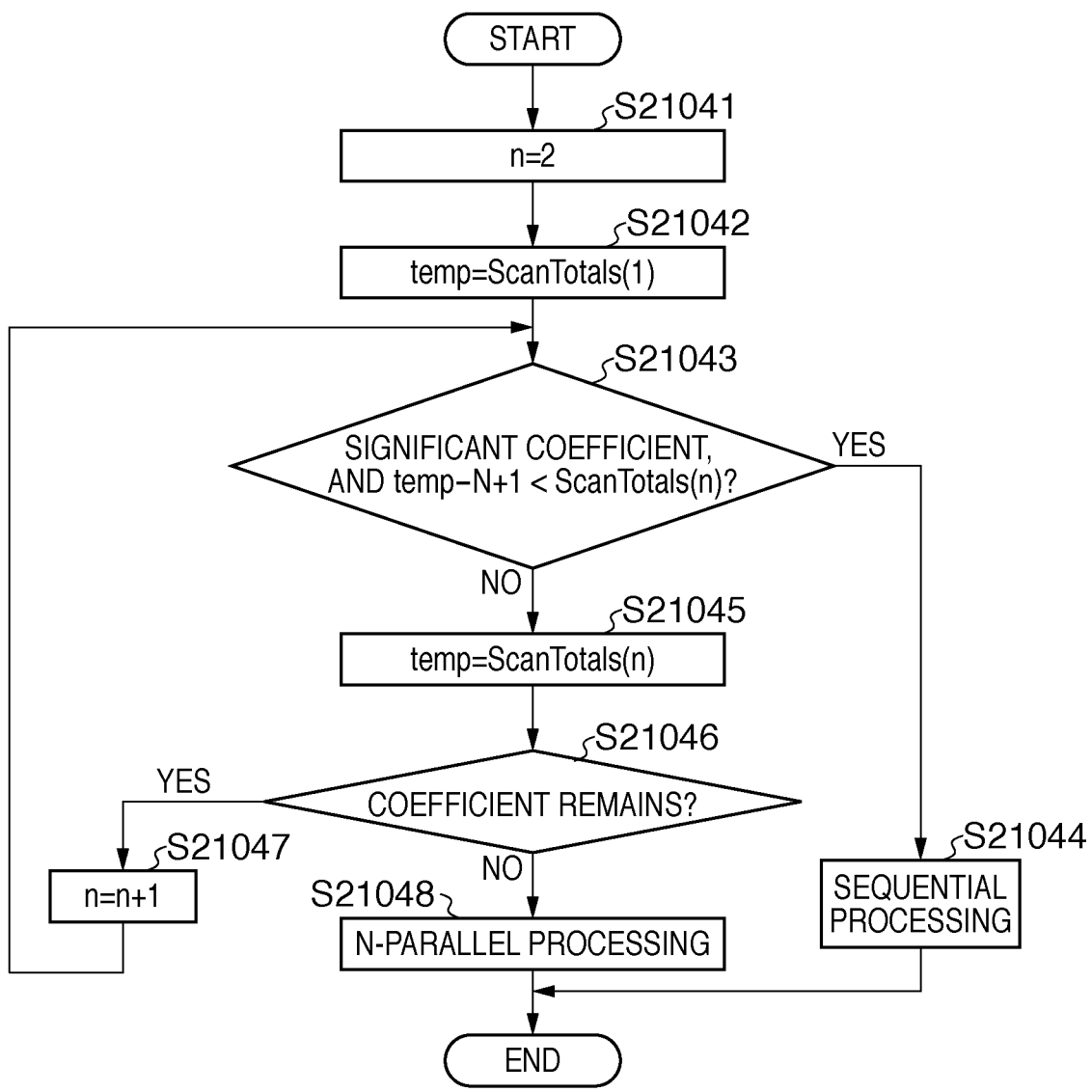
FIG. 20 is a flowchart of parallel number determination processing of the parallel number determination unit according to the second embodiment.

FIG. 20 is a flowchart illustrating the parallel number determination procedure of the parallel number determination unit 2104. The parallel number determination procedure of the parallel number determination unit 2104 will be explained below with reference to FIG. 20. When processing starts, 2 is substituted into a variable n in process S21041. In process S21042, statistical information ScanTotals(1) corresponding to the first scan order is substituted into a variable temp. In process S21043, it is determined whether the coefficient of the nth scan order is a significant coefficient, and the value temp-N+1 is smaller than the value of statistical information ScanTotals(n) of the nth scan order. If these conditions are satisfied, the process advances to process S21044. Otherwise, the process advances to process S21045. N is the number of blocks input in parallel. In this embodiment, N=2. In process S21044, it is determined to perform sequential processing. When process S21044 has been done, the determination processing ends. When the statistical information ScanTotals(n) of the nth scan order is substituted into the variable temp in process S21045, process S21046 is executed. In process S21046, it is confirmed whether a coefficient still remains in the block. If a coefficient remains, the process advances to process S21047. Otherwise, the process advances to process S21048. In process S21047, the value of the variable n is incremented, and the process returns to process S21043. In process S21048, it is determined to perform N-parallel processing. In the second embodiment, since N=2, it is determined to perform 2-parallel processing. When process S21048 has been done, the determination processing ends. The parallel number determination unit 2104 thus generates parallel process control information based on the statistical information ScanTotals and the information representing whether a coefficient is a significant coefficient.

Revert to the description of Term 1. In Term 1, the scan conversion unit 101 sorts the scan orders of the input blocks A and B in accordance with the coefficient position information output from the scan order holding unit 102 and the parallel control signal output from the parallel number determination unit 2104. In Term 1, the parallel control signal output from the parallel number determination unit 2104 indicates parallel processing. Hence, the blocks A and B undergo sort processing in parallel in accordance with the coefficient position information output from the scan order holding unit 102.

In Term 2, blocks C and D are respectively input as block data #1 and #2 to each of the scan conversion unit 101 and the scan status holding unit 103. In Term 2, the block C is also input to the significant data position information generation unit 2105. Since parallel processing has been executed in Term 1, and the coefficients at the positions indicated by full and open circles in FIGS. 23A and 23B are significant coefficients, the pieces of statistical information at the corresponding positions in the scan status holding unit 103 are updated to values as indicated by Term 2 in FIG. 23A. Since replacement of coefficient positions has not occurred upon inputting the blocks A and B, the coefficient position information in the scan order holding unit 102 does not change in Term 2. In Term 2, the significant data position information generation unit 2105 generates pieces of information each representing whether a corresponding coefficient in the block C is a significant coefficient, arranges them based on the scan order in accordance with the coefficient position information output from the scan order holding unit 102, and outputs the information to the parallel number determination unit 2104 as significant coefficient position information. Based on the coefficient position information output from the scan order holding unit 102, the statistical information output from the scan status holding unit 103, and the significant coefficient position information output from the significant data position information generation unit 2105, the parallel number determination unit 2104 outputs a parallel control signal to the scan conversion unit 101 and the scan status holding unit 103 in accordance with the procedure shown in FIG. 20. In Term 2, a portion where the scan orders replace each other exists, as indicated by Term 2 in FIG. 23A. Hence, the parallel number determination unit 2104 outputs a parallel control signal indicating sequential processing. In Term 2, since the parallel control signal indicates sequential processing, the scan status holding unit 103 updates, out of the pieces of currently held statistical information, only information corresponding to the significant coefficients of the input block C, and outputs the information to the scan order holding unit 102 as the next statistical information. The positions corresponding to the significant coefficients of the input block C to be updated are indicated by full circles in Term 2 of FIG. 23A. The scan order holding unit 102 decides the coefficient position information using the statistical information in the next status output from the scan status holding unit 103. In Term 2, the scan conversion unit 101 outputs the results of scan conversion processing of the blocks A and B in Term 1 as converted data outputs #1 and #2. Since the parallel control signal output from the parallel number determination unit 2104 indicates sequential processing, the scan conversion unit 101 sorts only the block C in accordance with the coefficient position information output from the scan order holding unit 102.

In Term 3, blocks D and E are respectively input as block data #1 and #2 to each of the scan conversion unit 101 and the scan status holding unit 103. In Term 3, the block D is also input to the significant data position information generation unit 2105. Since sequential processing has been executed in Term 2, and the coefficients at the positions indicated by full circles in FIGS. 23A and 23B are significant coefficients of the block C, the pieces of statistical information at the corresponding positions in the scan status holding unit 103 are updated to values as indicated by Term 3 in FIG. 23A. Since replacement of coefficient positions has occurred upon inputting the block C, the coefficient position information in the scan order holding unit 102 is updated as indicated by Term 3 in FIG. 23A. In Term 3, the significant data position information generation unit 2105 generates pieces of information each representing whether a corresponding coefficient in the block D is a significant coefficient, arranges them based on the scan order in accordance with the coefficient position information output from the scan order holding unit 102, and outputs the information to the parallel number determination unit 2104 as significant coefficient position information. In Term 3, no portion where the scan orders replace each other in the next status exists. Hence, the parallel number determination unit 2104 outputs a parallel control signal indicating parallel processing to the scan conversion unit 101 and the scan status holding unit 103 in accordance with the procedure shown in FIG. 20. In Term 3, since the parallel control signal indicates parallel processing, the scan status holding unit 103 updates, out of the pieces of currently held statistical information, information corresponding to the significant coefficients of the input blocks D and E, and outputs the information to the scan order holding unit 102 as the next statistical information. The positions corresponding to the significant coefficients of the input blocks D and E to be updated are indicated by full and open circles in Term 3 of FIG. 23A. The scan order holding unit 102 decides the coefficient position information using the statistical information in the next status output from the scan status holding unit 103. In Term 3, the scan conversion unit 101 outputs the result of scan conversion processing of the block C in Term 2 as converted data output #1. The scan conversion unit 101 also holds the result of the scan conversion processing of the block B and outputs it as converted data output #2. Since the parallel control signal output from the parallel number determination unit 2104 indicates parallel processing, the scan conversion unit 101 sorts the blocks D and E in parallel in accordance with the coefficient position information output from the scan order holding unit 102.

In Term 4, blocks F and G are respectively input as block data #1 and #2 to each of the scan conversion unit 101 and the scan status holding unit 103. In Term 4, the block F is also input to the significant data position information generation unit 2105. Since parallel processing has been executed in Term 3, and the coefficients at the positions indicated by full and open circles in FIGS. 23A and 23B are significant coefficients, the pieces of statistical information at the corresponding positions in the scan status holding unit 103 are updated to values as indicated by Term 4 in FIG. 23B. Since replacement of coefficient positions has not occurred upon inputting the blocks D and E, the coefficient position information in the scan order holding unit 102 does not change in Term 4. In Term 4, the significant data position information generation unit 2105 generates pieces of information each representing whether a corresponding coefficient in the block F is a significant coefficient, arranges them based on the scan order in accordance with the coefficient position information output from the scan order holding unit 102, and outputs the information to the parallel number determination unit 2104 as significant coefficient position information. Based on the coefficient position information output from the scan order holding unit 102 and the statistical information output from the scan status holding unit 103, the parallel number determination unit 2104 outputs a parallel control signal to the scan conversion unit 101 and the scan status holding unit 103 in accordance with the procedure shown in FIG. 20. In Term 4, although a portion with the same statistical information exists, the coefficients are not significant coefficients, as indicated by Term 4 in FIG. 23B. Hence, it is determined that no coefficient position replacement occurs, and the parallel number determination unit 2104 outputs a parallel control signal indicating parallel processing. In Term 4, since the parallel control signal indicates parallel processing, the scan status holding unit 103 updates, out of the pieces of currently held statistical information, information corresponding to the significant coefficients of the input blocks F and G, and outputs the information to the scan order holding unit 102 as the next statistical information. The positions corresponding to the significant coefficients of the input blocks F and G to be updated are indicated by full and open circles in Term 4 of FIG. 23B. The scan order holding unit 102 decides the coefficient position information using the statistical information in the next status output from the scan status holding unit 103. In Term 4, the scan conversion unit 101 outputs the results of scan conversion processing of the blocks D and E in Term 3 as converted data outputs #1 and #2. Since the parallel control signal output from the parallel number determination unit 2104 indicates parallel processing, the scan conversion unit 101 sorts the blocks F and G in parallel in accordance with the coefficient position information output from the scan order holding unit 102.

In Term 5, blocks H and I are respectively input as block data #1 and #2 to each of the scan conversion unit 101 and the scan status holding unit 103. In Term 5, the block H is also input to the significant data position information generation unit 2105. Since parallel processing has been executed in Term 4, and the coefficients at the positions indicated by full and open circles in FIGS. 23A and 23B are significant coefficients, the pieces of statistical information at the corresponding positions in the scan status holding unit 103 are updated to values as indicated by Term 5 in FIG. 23B. Since replacement of coefficient positions has not occurred upon inputting the blocks F and G, the coefficient position information in the scan order holding unit 102 does not change in Term 5. In Term 5, the significant data position information generation unit 2105 generates pieces of information each representing whether a corresponding coefficient in the block H is a significant coefficient, arranges them based on the scan order in accordance with the coefficient position information output from the scan order holding unit 102, and outputs the information to the parallel number determination unit 2104 as significant coefficient position information. In Term 5, no portion where the scan orders replace each other in the next status exists. Hence, the parallel number determination unit 2104 outputs a parallel control signal indicating parallel processing to the scan conversion unit 101 and the scan status holding unit 103 in accordance with the procedure shown in FIG. 20. In Term 5, since the parallel control signal indicates parallel processing, the scan status holding unit 103 updates, out of the pieces of currently held statistical information, information corresponding to the significant coefficients of the input blocks H and I, and outputs the information to the scan order holding unit 102 as the next statistical information. The positions corresponding to the significant coefficients of the input blocks H and I to be updated are indicated by full and open circles in Term 5 of FIG. 23B. The scan order holding unit 102 decides the coefficient position information using the statistical information in the next status output from the scan status holding unit 103. In Term 5, the scan conversion unit 101 outputs the result of scan conversion processing of the blocks F and G in Term 4 as converted data outputs #1 and #2. Since the parallel control signal output from the parallel number determination unit 2104 indicates parallel processing, the scan conversion unit 101 sorts the blocks H and I in parallel in accordance with the coefficient position information output from the scan order holding unit 102. The scan conversion processing is repeated in the same way.

The arrangements and operations of the units according to the second embodiment will be described next. The scan conversion unit 101, scan order holding unit 102, and scan status holding unit 103 are the same as in the first embodiment, and a description thereof will not be repeated.

The internal arrangement and operation of the parallel number determination unit 2104 will be explained with reference to FIG. 19.

Referring to FIG. 19, the input statistical information is split into ScanTotals of coefficients a to o and input to a sorter 1041. The sorter 1041 sorts the ScanTotals of the coefficients a to o in accordance with the coefficient position information based on the scan orders 1 to 15 and outputs the ScanTotals to a comparator 1042. The comparator 1042 compares the ScanTotals of the scan orders 1 to 15 and outputs the comparison result to a parallel number determination unit 21045. The description of the comparator 1042 is the same as in the first embodiment and will not be repeated. The input significant coefficient information is split into nonzero information of the scan order 2 to 15 and input to a parallel number determination unit 21044. The parallel number determination unit 21044 includes a plurality of logic inverting gates which logically invert the nonzero information of the scan orders 2 to 15 and output them to the parallel number determination unit 21045. The parallel number determination unit 21045 includes a plurality of logic OR gates which logically OR the comparison results from all comparators 10421 in the comparator 1042 and the logic inversion results of the nonzero information of the scan orders 2 to 15 output from the parallel number determination unit 21044, and output the logic ORs. A logic AND gate 1043 logically ANDS all outputs from the parallel number determination unit 21045 and outputs the logic AND to the outside as a parallel control signal. In this case, the parallel control signal indicates a parallel process instruction by "1" and a sequential process instruction by "0".

Figure 21:
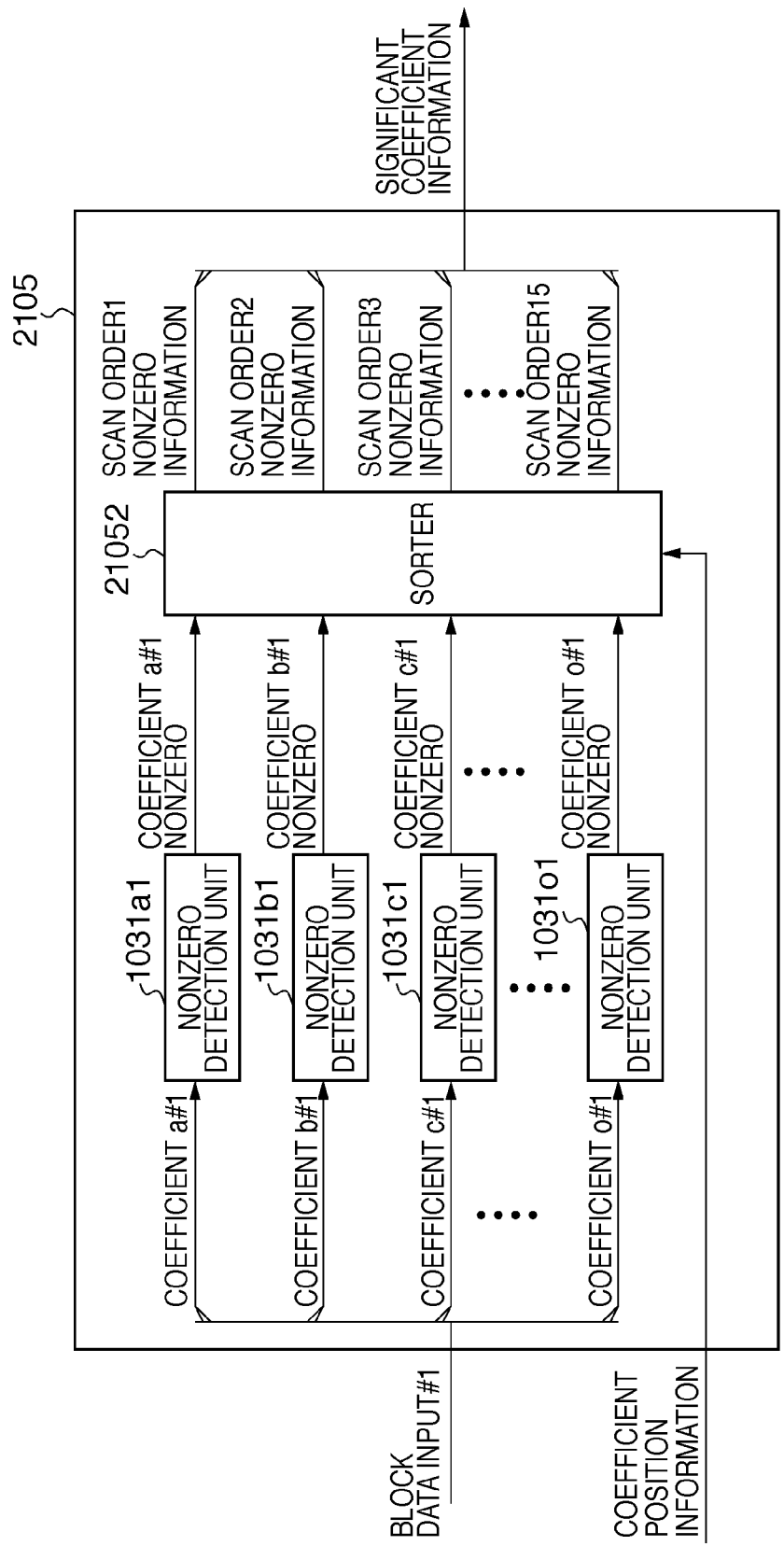
FIG. 21 is a block diagram showing the arrangement of a significant data position information generation unit according to the second embodiment.

The internal arrangement and operation of the significant data position information generation unit 2105 according to the second embodiment will be described next with reference to FIG. 21.

Block data input #1 is split into coefficients a #1 to o #1, and the coefficients are input to scan status holding units 1031a to 1031o, respectively. The scan status holding units 1031a to 1031o determine whether the coefficients a #1 to o #1 are 0, and output the determination results as the nonzero signals of the coefficients a #1 to o #1. In the second embodiment, "1" is output as a nonzero signal representing nonzero. Otherwise, "0" is output. A significant data position information generation unit 21052 serves as a sorter which sorts the coefficients a #1 to o #1 based on the scan orders 1 to 15 in accordance with the coefficient position information and outputs them as the nonzero information of the scan orders 1 to 15. The pieces of nonzero information of the scan orders 1 to 15 are output to the outside as significant coefficient information.

The embodiments of the present invention have been described above. Note that in the above-described embodiments, each of two-dimensionally arrayed blocks as the scan conversion target has a size of 4×4 pixels, and 15 AC components of a block have been exemplified. However, the present invention is not limited to this. In general, the block size can be expressed by n rows×m columns or m×n data. It is only necessary to instruct to perform scan conversion processing of N blocks (N≧2) as M-parallel processing (M is an integer: 1≦M≦N).

In the embodiments, the pieces of statistical information ScanTotals( ) and the coefficient positions ScanOrder( ) are managed in separate tables, as shown in FIGS. 7A and 7B. However, they may be managed in a single table because a piece of statistical information and a coefficient position are handled as a pair.

In the above-described embodiments, the apparatus of the present invention is accommodated in an encoder incorporated in a camera. However, the present invention is not limited to this.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-034390, filed Feb. 17, 2009, which is hereby incorporated by reference herein in its entirety.

The invention claimed is:

1. An apparatus for sorting data in a block having n rows×m columns based on a predetermined scan order, comprising:
    scan status holding means for updating and holding a current scan status in accordance with a status of the data in the block;
    scan order holding means for updating and holding a scan order in accordance with the scan status;
    parallel number determination means for instructing to perform scan conversion processing of N blocks (N is an integer: N≧2) as M-parallel processing (M is an integer: 1≦M≦N) in accordance with the scan status held by said scan status holding means; and
    scan conversion means for sorting, in accordance with the instruction from said parallel number determination means, the data in the block based on the scan order held by said scan order holding means.

2. An apparatus for sorting data in a block having n rows×m columns based on a predetermined scan order, comprising:
    scan status holding means for updating and holding a current scan status in accordance with a status of the data in the block;
    scan order holding means for updating and holding a scan order in accordance with the scan status;
    significant data position information generation means for generating position information of significant data that exists in the block;
    parallel number determination means for instructing to perform scan conversion processing of N blocks (N is an integer: N≧2) as M-parallel processing (M is an integer: 1≦M≦N) in accordance with the scan status held by said scan status holding means and the position information output from said significant data position information generation means; and
    scan conversion means for sorting, in accordance with the instruction from said parallel number determination means, the data in the block based on the scan order held by said scan order holding means.

3. A method of sorting data in a block having n rows×m columns based on a predetermined scan order, comprising:
    a scan status holding step of updating and holding a current scan status in accordance with a status of the data in the block;
    a scan order holding step of updating and holding a scan order in accordance with the scan status;
    a parallel number determination step of instructing to perform scan conversion processing of N blocks (N is an integer: N≧2) as M-parallel processing (M is an integer:

$1 \leq M \leq N$) in accordance with the scan status held in the scan status holding step; and a scan conversion step of sorting, in accordance with the instruction in the parallel number determination step, the data in the block based on the scan order held in the scan order holding step.

4. A method of sorting data in a block having n rows×m columns based on a predetermined scan order, comprising:

a scan status holding step of updating and holding a current scan status in accordance with a status of the data in the block;

a scan order holding step of updating and holding a scan order in accordance with the scan status;

a significant data position information generation step of generating position information of significant data that exists in the block;

a parallel number determination step of instructing to perform scan conversion processing of N blocks (N is an integer: $N \geq 2$) as M-parallel processing (M is an integer: $1 \leq M \leq N$) in accordance with the scan status held in the scan status holding step and the position information output in the significant data position information generation step; and a scan conversion step of sorting, in accordance with the instruction in the parallel number determination step, the data in the block based on the scan order held in the scan order holding step.

5. An image encoding apparatus comprising:

image dividing means for dividing an image into unit blocks each having n rows×m columns;

orthogonal transform means for performing orthogonal transform of each unit block output from said image dividing means and outputting transform coefficients;

quantization means for quantizing the transform coefficients output from said orthogonal transform means and outputting quantized transform coefficients;

scan conversion means for sorting the quantized transform coefficients output from said quantization means in each unit block and outputting the quantized transform coefficients; and entropy encoding means for entropy-encoding the quantized transform coefficients output from said scan conversion means and outputting a code stream, said scan conversion means comprising:

scan status holding means for updating and holding a current scan status in accordance with a status of data in the block;

scan order holding means for updating and holding a scan order in accordance with the scan status;

parallel number determination means for instructing to perform scan conversion processing of N blocks (N is an integer: $N \geq 2$) as M-parallel processing (M is an integer: $1 \leq M \leq N$) in accordance with the scan status held by said scan status holding means; and scan conversion means for sorting, in accordance with the instruction from said parallel number determination means, the data in the block based on the scan order held by said scan order holding means.

6. An image encoding apparatus comprising:

image dividing means for dividing an image into unit blocks each having n rows×m columns;

orthogonal transform means for performing orthogonal transform of each unit block output from said image dividing means and outputting transform coefficients;

quantization means for quantizing the transform coefficients output from said orthogonal transform means and outputting quantized transform coefficients;

scan conversion means for sorting the quantized transform coefficients output from said quantization means in each unit block and outputting the quantized transform coefficients; and entropy encoding means for entropy-encoding the quantized transform coefficients output from said scan conversion means and outputting a code stream, said scan conversion means comprising:

scan status holding means for updating and holding a current scan status in accordance with a status of data in the block;

scan order holding means for updating and holding a scan order in accordance with the scan status;

significant data position information generation means for generating position information of significant data that exists in the block;

parallel number determination means for instructing to perform scan conversion processing of N blocks (N is an integer: $N \geq 2$) as M-parallel processing (M is an integer: $1 \leq M \leq N$) in accordance with the scan status held by said scan status holding means and the position information output from said significant data position information generation means; and scan conversion means for sorting, in accordance with the instruction from said parallel number determination means, the data in the block based on the scan order held by said scan order holding means.

7. A method of controlling an image encoding apparatus, comprising:

an image dividing step of dividing an image into unit blocks each having n rows×m columns;

an orthogonal transform step of performing orthogonal transform of each unit block output in the image dividing step and outputting transform coefficients;

a quantization step of quantizing the transform coefficients output in the orthogonal transform step and outputting quantized transform coefficients;

a scan conversion step of sorting the quantized transform coefficients output in the quantization step in each unit block and outputting the quantized transform coefficients; and an entropy encoding step of entropy-encoding the quantized transform coefficients output in the scan conversion step and outputting a code stream, the scan conversion step comprising:

a scan status holding step of updating and holding a current scan status in accordance with a status of data in the block;

a scan order holding step of updating and holding a scan order in accordance with the scan status;

a parallel number determination step of instructing to perform scan conversion processing of N blocks (N is an integer: $N \geq 2$) as M-parallel processing (M is an integer: $1 \leq M \leq N$) in accordance with the scan status held in the scan status holding step; and a scan conversion step of sorting, in accordance with the instruction in the parallel number determination step, the data in the block based on the scan order held in the scan order holding step.

8. A method of controlling an image encoding apparatus, comprising:

an image dividing step of dividing an image into unit blocks each having n rows×m columns;

an orthogonal transform step of performing orthogonal transform of each unit block output in the image dividing step and outputting transform coefficients;

a quantization step of quantizing the transform coefficients output in the orthogonal transform step and outputting quantized transform coefficients;

a scan conversion step of sorting the quantized transform coefficients output in the quantization step in each unit block and outputting the quantized transform coefficients; and an entropy encoding step of entropy-encoding the quantized transform coefficients output in the scan conversion step and outputting a code stream, the scan conversion step comprising:

a scan status holding step of updating and holding a current scan status in accordance with a status of data in the block;

a scan order holding step of updating and holding a scan order in accordance with the scan status;

a significant data position information generation step of generating position information of significant data that exists in the block;

a parallel number determination step of instructing to perform scan conversion processing of N blocks (N is an integer: $N \geq 2$) as M-parallel processing (M is an integer: $1 \leq M \leq N$) in accordance with the scan status held in the scan status holding step and the position information output in the significant data position information generation step and a scan conversion step of sorting, in accordance with the instruction in the parallel number determination step, the data in the block based on the scan order held in the scan order holding step.

9. A scan conversion apparatus which repeatedly executes, for run-length encoding, scanning N data in two-dimensionally arrayed blocks each having m×n data to convert the N data into one-dimensionally arrayed data and outputting the data, comprising:

setting means for setting initial sorting information in which positions of scan target data in the m×n data and statistical appearance frequency values of nonzero at the positions are paired and arranged in descending order of the appearance frequency values of the scan target data;

a plurality of scan conversion means executable in parallel, each scan conversion means sequentially reading out and outputting data in a block of interest in an order of data positions based on the sorting information, and if the readout data is nonzero, increasing the appearance frequency value at the position of the data;

update means for, if a portion where the appearance frequency values are arranged in ascending order exists in the sorting information, updating the sorting information to attain the descending order by replacing two pairs determined to be arranged in the ascending order;

determination means for determining, by analyzing the sorting information, the minimum number P ($p \geq 1$) of blocks until execution of replacement processing by said update means; and scan control means for causing P of said plurality of scan conversion means to convert P consecutive block data into a one-dimensional array in parallel.

10. A method of controlling a scan conversion apparatus which includes a plurality of scan conversion means executable in parallel, each scan conversion means sequentially reading out and outputting data in a block of interest in an order of data positions based on sorting information, and if the readout data is nonzero, increasing an appearance frequency value at a position of the data, and repeatedly executes, for run-length encoding, causing at least one scan conversion means to scan two-dimensionally arrayed blocks each having m×n data to convert the data into one-dimensionally arrayed data and outputting the data, comprising:

a setting step of setting initial sorting information in which positions of scan target data in the m×n data and statistical appearance frequency values of nonzero at the positions are paired and arranged in descending order of the appearance frequency values of the scan target data; and an update step of updating, if a portion where the appearance frequency values are arranged in ascending order exists in the sorting information, the sorting information to attain the descending order by replacing two pairs determined to be arranged in the ascending order;

a determination step of determining, by analyzing the sorting information, the minimum number P ($p \geq 1$) of blocks until execution of replacement processing in the update step; and a scan control step of causing P of the plurality of scan conversion means to convert P consecutive block data into a one-dimensional array in parallel.

* * * * *